(12) United States Patent
Kean et al.

(10) Patent No.: US 8,314,918 B2
(45) Date of Patent: Nov. 20, 2012

(54) DISPLAY

(75) Inventors: Diana Ulrich Kean, Watlington (GB);
Anthony John Carver, Maidenhead (GB); Paul A. Gass, Headington (GB); Heather Ann Stevenson, Leaminton Spa (GB); Emma Jayne Walton, Beckley (GB)

(73) Assignee: Sharp Kabushiki Kaisha, Osaka (JP)

( * ) Notice: Subject to any disclaimer, the term of this patent is extended or adjusted under 35 U.S.C. 154(b) by 1256 days.

(21) Appl. No.: 11/916,815

(22) PCT Filed: Jun. 5, 2006

(86) PCT No.: PCT/JP2006/311671
§ 371 (c)(1),
(2), (4) Date: Mar. 13, 2008

(87) PCT Pub. No.: WO2006/132384
PCT Pub. Date: Dec. 14, 2006

(65) Prior Publication Data
US 2009/0128746 A1 May 21, 2009

(30) Foreign Application Priority Data
Jun. 7, 2005 (GB) .................................. 0511536.5

(51) Int. Cl.
*C09K 19/02* (2006.01)
(52) U.S. Cl. ............ 349/181; 349/74; 349/76; 349/123; 349/129
(58) Field of Classification Search .................. None
See application file for complete search history.

(56) References Cited

U.S. PATENT DOCUMENTS 2,053,173 A 9/1936 Astima
2,689,387 A 9/1954 Carr
(Continued)

FOREIGN PATENT DOCUMENTS
JP 09-105958 A 4/1997
(Continued)

OTHER PUBLICATIONS

Official communication issued in Corresponding U.K. Application No. GB0511536.5, searched on Aug. 19, 2005.
(Continued)

*Primary Examiner* — Thanh-Nhan P Nguyen
(74) *Attorney, Agent, or Firm* — Keating & Bennett, LLP

(57) ABSTRACT

A display includes a display device having a first polarizer and a second polarizer or a reflector, and a display layer disposed between the first polarizer and the second polarizer or the reflector. A liquid crystal layer is disposed between the display layer and one of the first polarizer and the second polarizer or reflector. The liquid crystal molecules of at least one region of the liquid crystal layer are switchable between a first state in which the display has a first display mode with a first viewing angle range and a second state in which the display has a second display mode having a second viewing angle range smaller than the first viewing angle range. In the second state, liquid crystal molecules of the at least one region are tilted with respect to the normal axis of the display over at least a portion of the thickness of the liquid crystal layer, and lie substantially parallel to a plane defined by the normal axis of the display and the transmission axis or absorption axis of the first polarizer or one of the first and second polarizers.

34 Claims, 23 Drawing Sheets

( wide mode )

U.S. PATENT DOCUMENTS

| | | | |
|---|---|---|---|
| 3,031,351 | A | 4/1962 | McIlvaine |
| RE27,617 | E | 4/1973 | Olsen |
| 4,764,410 | A | 8/1988 | Grzywinski |
| 4,766,023 | A | 8/1988 | Lu |
| 5,147,716 | A | 9/1992 | Bellus |
| 5,528,319 | A | 6/1996 | Austin |
| 5,825,436 | A | 10/1998 | Knight |
| 5,831,698 | A | 11/1998 | Depp et al. |
| 5,877,829 | A | 3/1999 | Okamoto et al. |
| 6,211,930 | B1 | 4/2001 | Sautter et al. |
| 6,552,850 | B1 | 4/2003 | Dudasik |
| 6,900,786 | B1 | 5/2005 | Johnson et al. |
| 2002/0158967 | A1 | 10/2002 | Janick et al. |
| 2004/0125298 | A1* | 7/2004 | Oh et al. ............ 349/129 |
| 2005/0243265 | A1 | 11/2005 | Winlow et al. |

FOREIGN PATENT DOCUMENTS

| | | |
|---|---|---|
| JP | 11-007045 A | 1/1999 |
| JP | 11-174489 A | 7/1999 |
| JP | 2003-028263 A | 1/2003 |
| WO | 01/88605 A2 | 11/2001 |

OTHER PUBLICATIONS

Official communication issued in the International Application No. PCT/JP2006/311671, mailed on Aug. 22, 2006.

Hisatake et al., "31.3: Viewing Angle Controllable LCD using Variable Optical Compensator and Variable Diffuser"; SID 05 Digest, May 2005 pp. 1218-1221.

Bos et al., "The pj-Cell: A Fast Liquid-Crystal Optical-Switching Device"; Mol. Cryst. Liq. Cyrst., 1984, vol. 113, pp. 329-339.

* cited by examiner

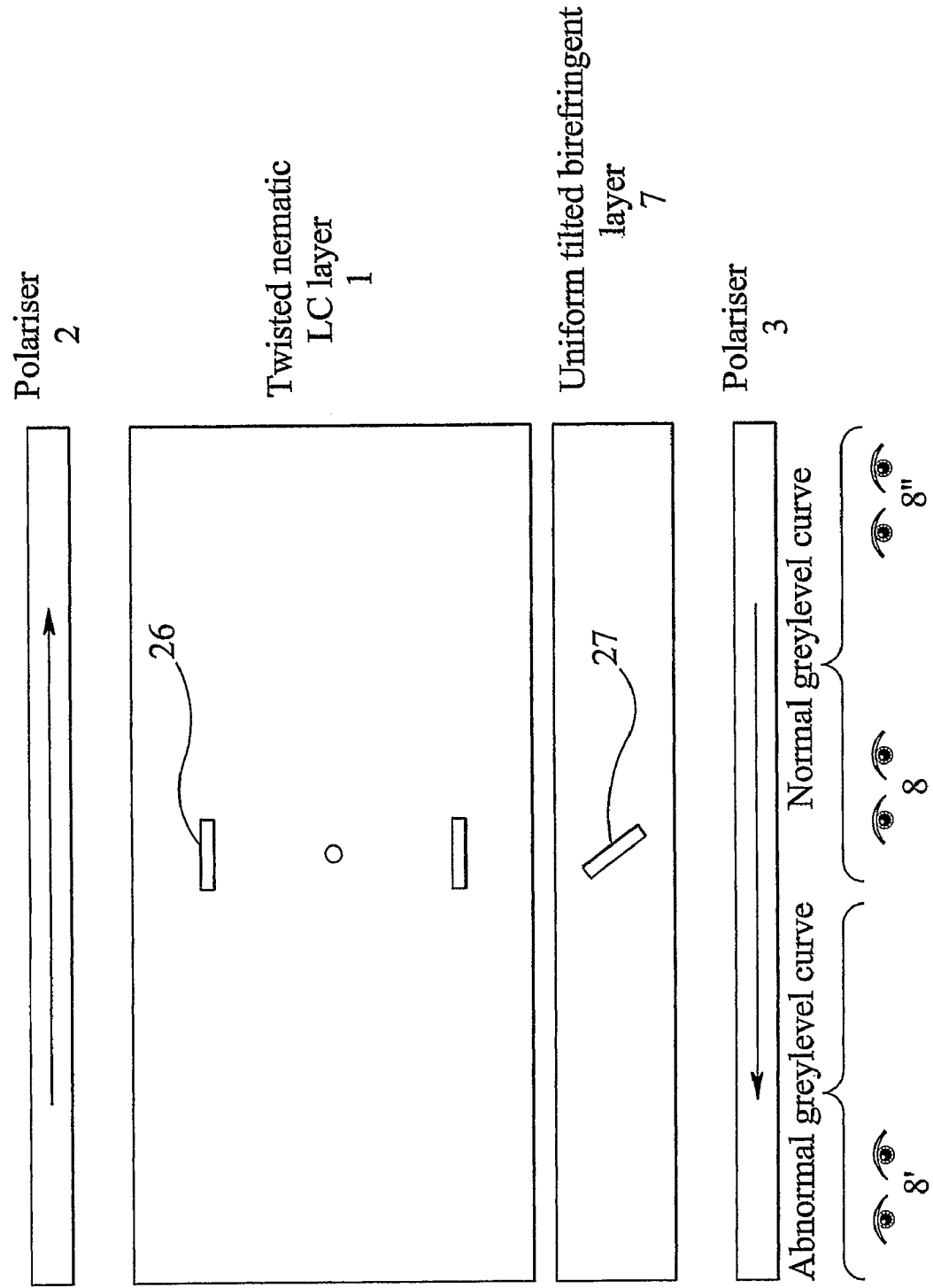

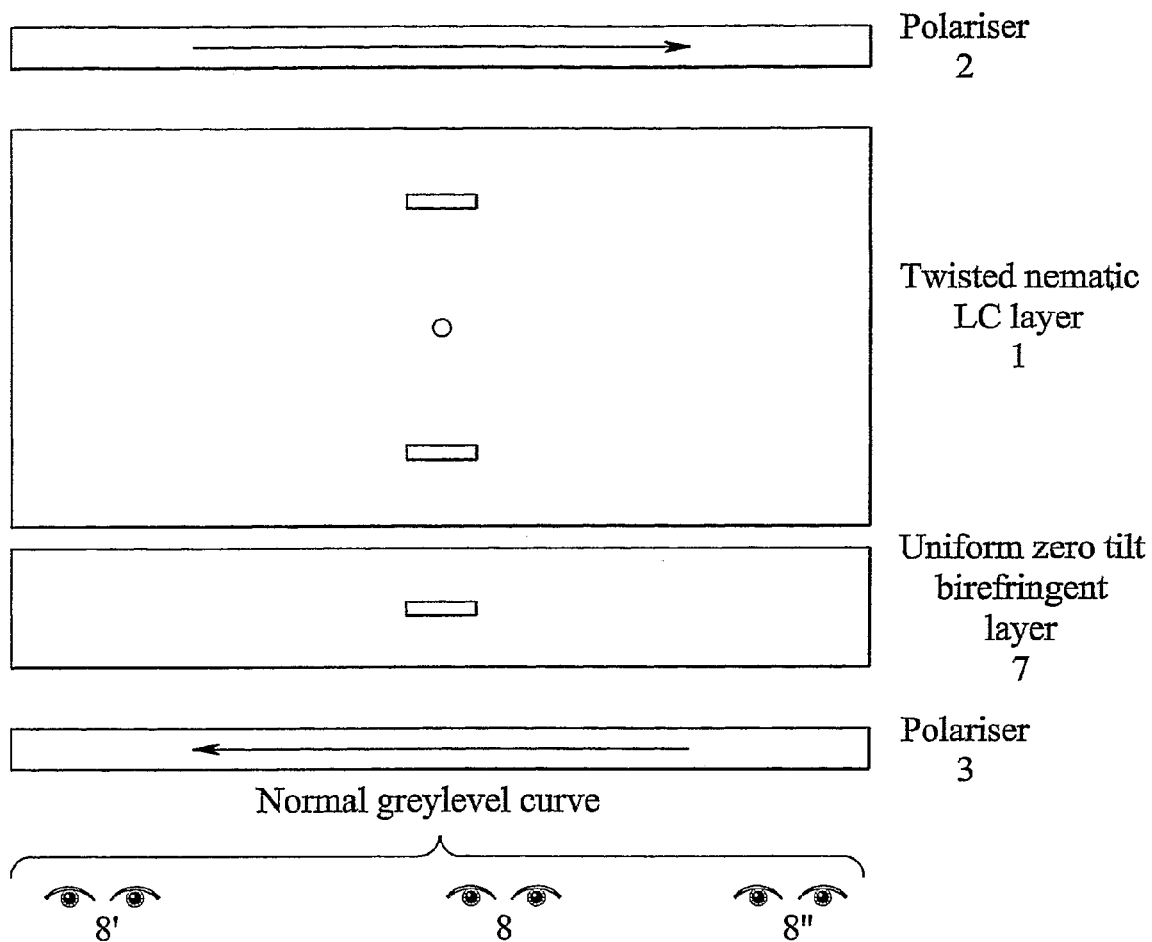

FIG. 2D
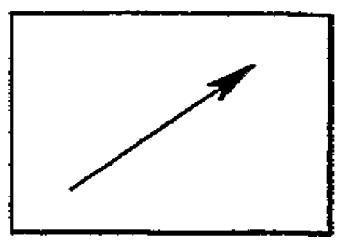
(i)
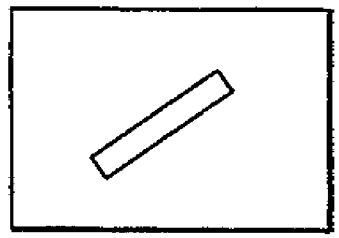
(ii)
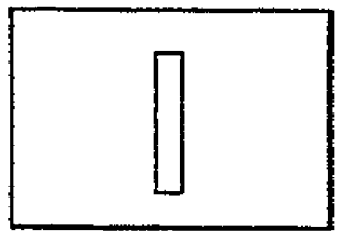
(iii)
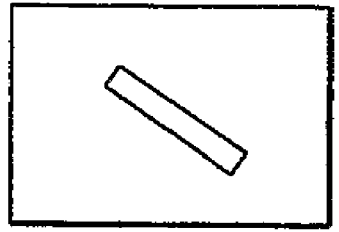
(iv)
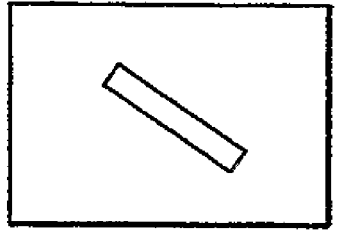
(v)
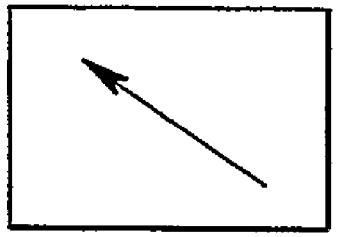
(vi)

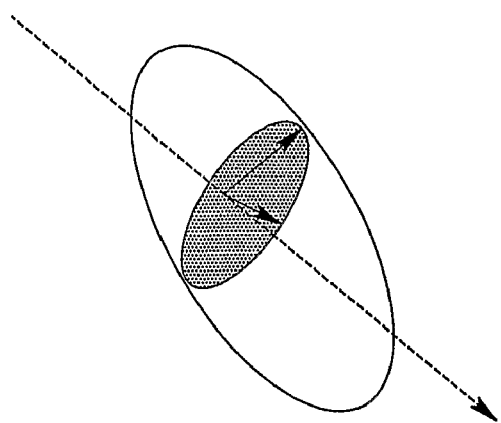
FIG. 3A1
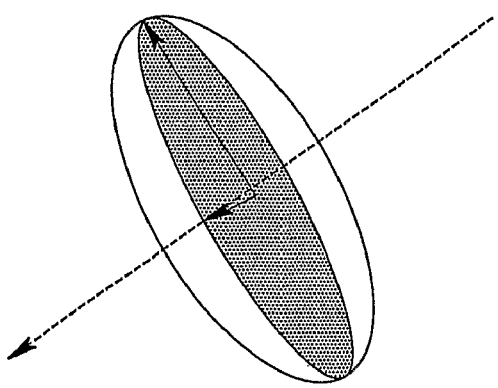
FIG. 3A2
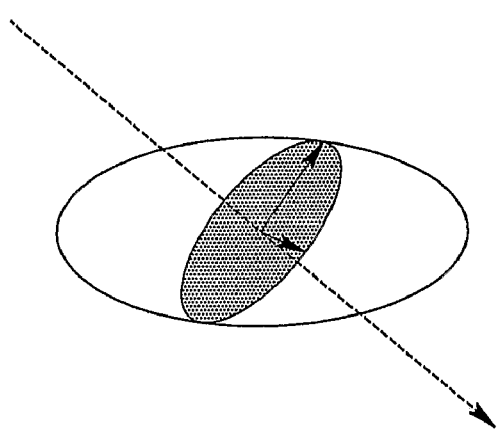
FIG. 3A3
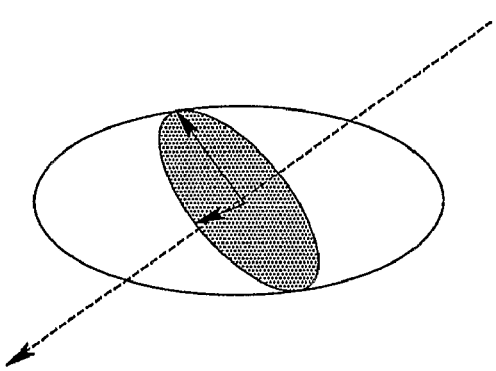
FIG. 3A4

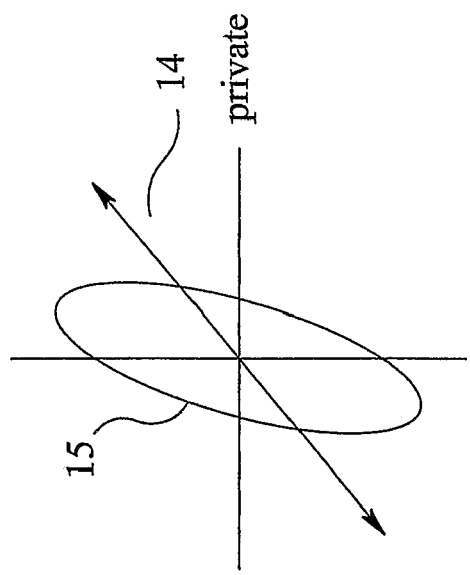
FIG. 3B1
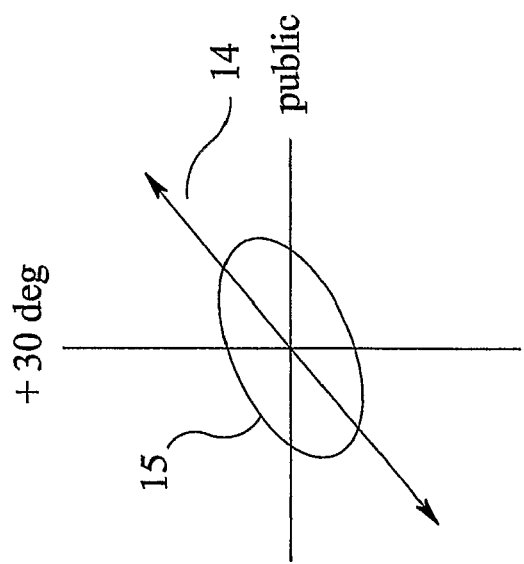
FIG. 3B3 private
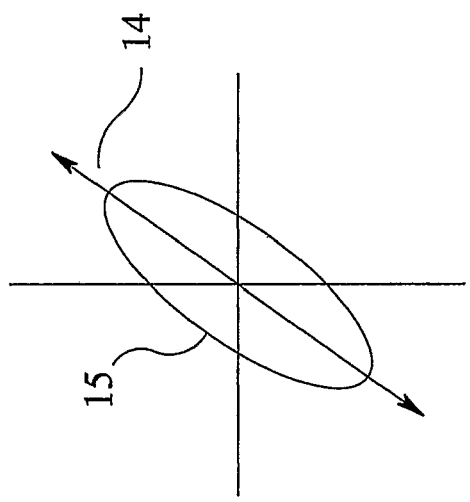
FIG. 3B2
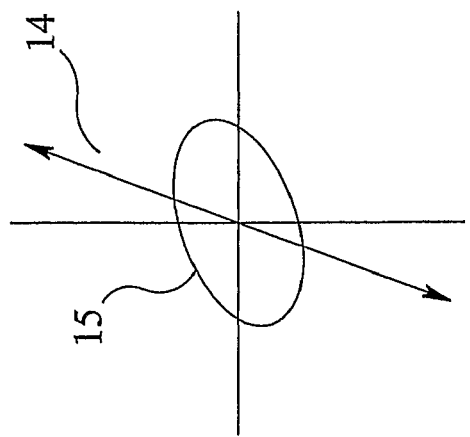
FIG. 3B4 −30 deg
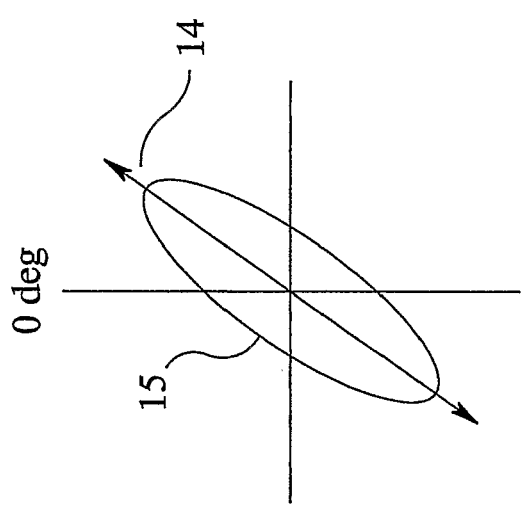
FIG. 3B5 0 deg
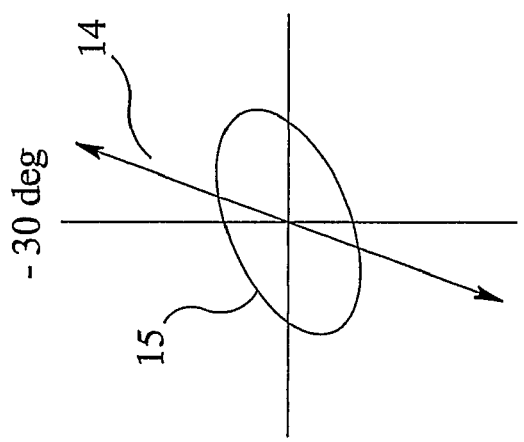
FIG. 3B6 +30 deg public

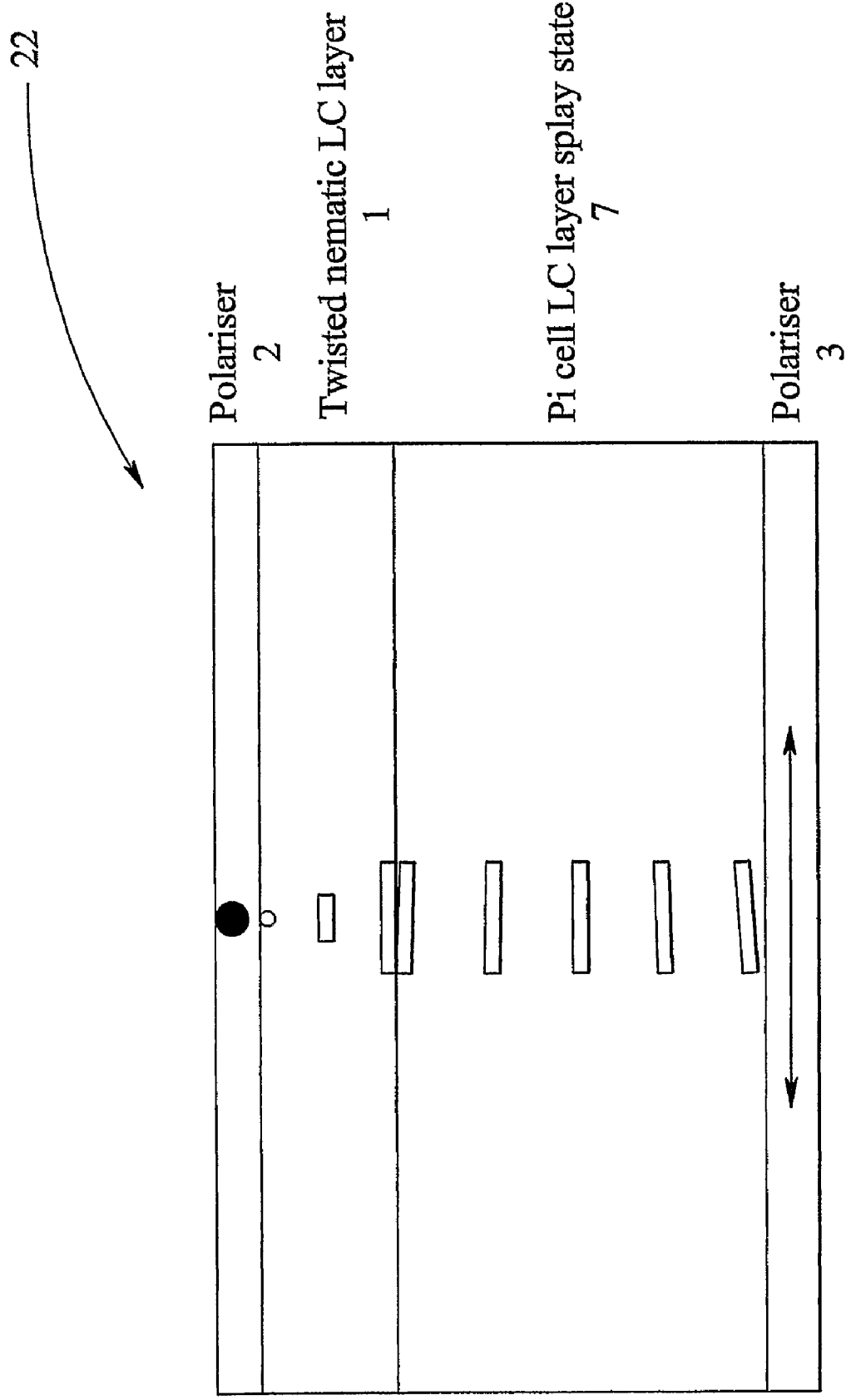
FIG. 5A (wide mode)

(narrow mode)

(wide mode)

(narrow mode)

(wide mode)

(narrow mode)

(wide mode)

(narrow mode)

DISPLAY

BACKGROUND OF THE INVENTION

1. Field of the Invention

The present invention relates to a display in which the angular output range of light is controllable, so that the display can be switched between a wide angle viewing mode and a narrow angle viewing mode.

2. Description of the Related Art

Electronic display devices such as, for example, monitors used with computers and screens built in to mobile telephones and other portable information devices, are usually designed to have as wide a viewing angle as possible, so that an image displayed by the device can be seen from many different viewing positions. However, there are some situations where it is desirable for an image displayed by a device to be visible from only a narrow range of viewing angles. For example, a person using a portable computer in a crowded train might want the display screen of the computer to have a small viewing angle so that a document displayed on the computer screen cannot be read by other passengers on the train. For this reason, there has been considerable effort put in to developing display devices which are electrically switchable between two modes of operation—in a 'public' display mode they have a wide viewing angle for general use, but they can be switched to a 'private' display mode in which they have a narrow viewing angle so that private information can be displayed in public places without being visible to people other than the user of the device.

Another application of such a display may be as a display in a motor vehicle. The viewing angle of the display could be controlled such that the passengers are unable to see the display or such that the driver is unable to see the display. Alternatively the viewing angle could be controlled in order to reduce the reflections of the display on the windshield and the windows so that, for example, the viewing angle could be reduced at nighttime or in low light conditions. A brightness sensor could be provided to allow automatic switching between a wide viewing angle and a narrow viewing angle, and also to allow automatic control of the brightness of the display.

A number of devices are known which restrict the range of angles or positions from which a display can be viewed.

U.S. Pat. No. 6,552,850 describes a method for the display of private information on an automatic teller machine (ATM). Light emitted by the machine's display has a fixed polarization state, and the machine and its user are surrounded by a large screen of sheet polarizer which absorbs light of that polarization state but transmits light of a perpendicular polarization state. Passers-by can see the user and the machine, but cannot see information displayed on the machine's screen.

One known element for controlling the direction of light is a 'louvered' film that consists of alternating transparent layers and opaque layers provided in an arrangement similar to a Venetian blind. The film operates on the same principle as a Venetian blind, and it allows light to pass through it when the light is traveling in a direction parallel to, or nearly parallel to, the opaque layers. However, light traveling at large angles relative to the plane of the opaque layers is incident on one of the opaque layers and is absorbed. The layers may be perpendicular to the surface of the film or they may be at some other angle relative to the surface of the film.

Louvered films of this type may be manufactured by stacking many alternating sheets of transparent material and opaque material and then cutting slices of the resulting block perpendicular to the layers. This method has been known for many years and is described in, for example, U.S. Pat. Nos. 2,053,173; 2,689,387 and 3,031,351.

Other manufacturing methods are known. For example, U.S. Pat. No. RE 27,617 describes a process where a louvered film is cut continuously from a cylindrical billet of stacked layers. U.S. Pat. No. 4,766,023 describes how the optical quality and mechanical robustness of the resulting film can be improved by coating with a UV-curable monomer and then exposing the film to UV radiation. U.S. Pat. No. 4,764,410 describes a similar process where a UV-curable material is used to bond the louver sheet to a covering film.

Other methods exist for making films with similar properties to the louvered film. For example, U.S. Pat. No. 5,147,716 describes a light-control film which contains many elongated particles which are aligned in the direction perpendicular to the plane of the film. Light rays which make large angles to this direction are therefore strongly absorbed, whereas light rays propagating in this direction are transmitted.

Another example of a light-control film is described in U.S. Pat. No. 5,528,319. This film has a transparent body in which are embedded opaque regions that extend generally parallel to the plane of the film. The opaque regions are arranged in stacks, with each stack being spaced from a neighboring stack. The opaque regions block the transmission of light through the film in certain directions while allowing the transmission of light in other directions.

The prior art light control films may be placed either in front of a display panel or between a transmissive display panel and its backlight, to restrict the range of angles from which the display can be viewed. In other words, the prior art light control films make a display 'private'. However, none of the prior art light control films enables the privacy function to be switched off to allow viewing from a wide range of angles.

There have been reports of a display which can be switched between a public mode (with a wide viewing angle) and a private mode (with a narrow viewing angle). For example, US Patent Application Publication No. 2002/0158967 suggests that a light control film could be movably mounted on a display so that the light control film either may be positioned over the front of the display to provide a private mode or may be mechanically retracted into a holder behind or beside the display to give a public mode. This method has the disadvantage that it contains moving parts which may fail or be damaged in use, and which add bulk to the display.

A method for switching a display panel from public to private mode with no moving parts is to mount a light control film behind the display panel, and to place a diffuser which can be electronically switched on and off between the light control film and the panel. When the diffuser is inactive, the light control film restricts the range of viewing angles and the display is in a private mode. When the diffuser is switched on, the light with a narrow angle range output from the light control film is incident on the diffuser, and the diffuser acts to increase the angular spread of the light. That is, the diffuser cancels out the effect of the light control film. Thus, the display is illuminated by light traveling at a wide range of angles and the display operates in a public mode. It is also possible to mount the light control film in front of the panel and place the switchable diffuser in front of the light control film to achieve the same effect.

Switchable privacy devices of the above type are described in U.S. Pat. Nos. 5,831,698; 6,211,930; and 5,877,829. They have the disadvantage that the light control film always absorbs a significant fraction of the light incident upon it, whether the display is in public mode or private mode. The display is therefore inherently inefficient in its use of light. Furthermore, since the diffuser spreads light through a wide range of angles in the public mode, these displays are also dimmer in public mode than in private mode (unless the backlight is made brighter when the device is operating in public mode to compensate).

Another disadvantage of these devices relates to their power consumption. Such devices often use a switchable polymer-dispersed liquid crystal diffuser which is not diffusive when no voltage is applied across the liquid crystal layer and which is switched on (into the diffusive state) by applying a voltage. Thus, to obtain the public mode of operation it is necessary to apply a voltage across the diffuser so that the diffuser is switched on. More electrical power is therefore consumed in the public mode than in the private mode. This is a disadvantage for mobile devices which are used for most of the time in the public mode and which have limited battery power.

Another method for making a switchable public/private display is described in U.S. Pat. No. 5,825,436. The light control device in this patent is similar in structure to the louvered film described above. However, each opaque element in a conventional louvered film is replaced by a liquid crystal cell which can be electronically switched from an opaque state to a transparent state. The light control device is placed in front of or behind a display panel. When the cells are opaque, the display operates in a private mode; when the cells are transparent, the display operates in a public mode.

One significant disadvantage of this device is the difficulty and expense of manufacturing liquid crystal cells with an appropriate shape. A second disadvantage is that, in the private mode, a ray of light may enter at an angle such that it passes first through the transparent material and then through part of a liquid crystal cell. Such a ray will not be completely absorbed by the liquid crystal cell and this may reduce the privacy of the device.

Japanese Patent Application No. 2003-28263 describes a switchable viewing angle control mechanism for a liquid crystal (LC) panel. This uses an additional twisted nematic (TN) LC panel, which is patterned in a checkerboard pattern. In the narrow viewing mode, the limited viewing angle characteristics of a standard TN LC panel are used to make a checkerboard pattern appear when the LC panel is viewed from an angle well away from the normal direction. This checkerboard pattern is confusing for the viewer and degrades the quality of the image seen from an angle well away from the normal direction. This does have the disadvantage that an additional LC panel and an additional polarizer are required.

Japanese Patent Application No. 9-105958 describes a display having a switchable view angle control device, containing a liquid crystal material, placed in the path of light from an image display device. In a narrow display mode, the liquid crystal molecules of the view angle control device are oriented vertically (that is, perpendicular to the substrates and parallel to the normal axis of the display).

While the display of Japanese Patent Application No. 9-105958 can provide a narrow display mode, it is difficult to switch the view angle control device to give a wide display mode. One way of obtaining a wide display mode is to switch the liquid crystal material of the view angle control device to an isotropic state. However, this requires heating the liquid crystal material to a temperature at which it becomes isotropic, and this is undesirable. Alternatively, a wide display mode may be obtained by switching the liquid crystal material of the view angle control device such that the liquid crystal molecules are aligned horizontally (that is, parallel to the substrates). However, this requires switching the liquid crystal molecules between a vertical alignment and a horizontal alignment, and this is very hard to do in practice.

Y. Hisatake et al. disclose, in SID Digest '05, page 1218, a display having a switchable view angle control device, containing a liquid crystal material, placed in the path of light from an image display device. The view angle control device is an ultra super twisted ("UST") liquid crystal cell, that is switchable between a positive retardation state and a negative retardation state. The image display device is a twisted nematic liquid crystal cell. When the UST liquid crystal cell has a positive retardation, the viewing angle of the display is less than the viewing angle of the TN liquid crystal cell, whereas when the UST liquid crystal cell has a negative retardation, the viewing angle of the display is greater than the viewing angle of the TN liquid crystal cell.

The "Rocket" software provides a further method of switching a display between a public mode and a private mode. This software makes use of the fact that a grey level curve of a liquid crystal display is angle dependent, and may show contrast inversion at some viewing angles. It obtains a private viewing mode by operating the device in a voltage range which produces contrast inversion as high viewing angles, so that an image can be seen only at viewing angles close to the normal direction of the display. This approach has the disadvantage that it cannot obtain a good private viewing mode with newer liquid crystal materials that have grey level curves with a much reduced dependence on viewing angle.

SUMMARY OF THE INVENTION

A preferred embodiment of the present invention provides a display including: a display device having a first polarizer, one of a second polarizer and a reflector, and a display layer disposed between the first polarizer and the second polarizer or the reflector; and a liquid crystal layer disposed between the display layer and one of the first polarizer and the second polarizer or the reflector; wherein the liquid crystal molecules of at least a region of the liquid crystal layer are switchable between a first state in which the display has a first display mode with a first viewing angle range and a second state in which the display has a second display mode having a second viewing angle range smaller than the first viewing angle range, the liquid crystal layer having the same sign of retardation in the first state as in the second state; wherein, in the second state, liquid crystal molecules of the at least one region are tilted with respect to the normal axis of the display over at least a portion of the thickness of the liquid crystal layer, and lie substantially parallel to a plane defined by the normal axis of the display and the transmission axis or absorption axis of the first polarizer or one of the first and second polarizers.

In a display according to a preferred embodiment of the present invention, a narrow view mode is obtained by aligning the liquid crystal molecules of at least one region of the liquid crystal layer such that they have a tilt alignment over at least a portion of the thickness of the layer. A wide view mode may be obtained by switching the liquid crystal molecules to be perpendicular to the normal axis of the display (that is, to a horizontal alignment). Switching from a tilt alignment to a horizontal alignment is much easier to achieve than switching from a vertical alignment to a horizontal alignment as taught in JP 9-105958.

Aligning the liquid crystal molecules parallel to a plane defined by the normal axis of the display and the transmission axis or absorption axis of one of the polarizers (in the case of a transmissive display), or defined by the normal axis of the display and the transmission axis or absorption axis of the polarizer in the case of a reflective display having a single polarizer, ensures that, in the narrow view mode, an observer viewing the display along the normal axis of the display experiences a normal grey-level curve.

The display layer may be any suitable layer, for example, a liquid crystal layer or another electro-optic layer.

The grey-level curve of the display may be arranged to vary with viewing angle in the second display mode.

The liquid crystal molecules of the at least one region of the liquid crystal layer may produce, in the second state, an angle-dependent change in the polarization state of light passing through the at least one region of the liquid crystal layer.

The liquid crystal molecules of the at least one region of the liquid crystal layer may produce, in the second state, substantially no change in the polarization state of light passing through the at least one region of the liquid crystal layer at angles within the first angular viewing range.

The liquid crystal molecules of the at least one region of the liquid crystal layer may produce, in the second state, a viewing angle-dependent refractive index anisotropy for the at least one region of the liquid crystal layer.

The liquid crystal molecules of the at least one region of the liquid crystal layer may produce, in the second state, substantially zero refractive index anisotropy for light propagating along the normal axis of the display.

The liquid crystal molecules of the at least one region of the liquid crystal layer may produce, in the second state, a viewing angle-dependent angle between the optic axis of the liquid crystal layer and the transmission axis of one of the polarizers for the at least one region of the liquid crystal layer.

For light propagating along the normal axis of the display, the optic axis of the at least one region of the liquid crystal layer may be substantially parallel to the transmission axis of the one of the polarizers.

In the second state, the liquid crystal layer may have at least a first region in which the liquid crystal molecules have a first liquid crystal alignment and a second region in which the liquid crystal molecules have a second liquid crystal alignment different from the first liquid crystal alignment.

The first region and the second region may be laterally adjacent.

In the second state, the first region and the second region may each extend through the thickness of the liquid crystal layer.

The display may include a patterned alignment surface arranged to define the first region and the second region in the liquid crystal layer.

The display may include a patterned electrode layer arranged to define the first region and the second region in the liquid crystal layer.

In the second state, the first region may extend through a first portion of the thickness of the liquid crystal layer and the second region may extend through a second portion of the thickness of the liquid crystal layer.

The liquid crystal layer may be an OCB liquid crystal layer. Alternatively, the liquid crystal layer may be an ECB liquid crystal layer.

The display may include another liquid crystal layer, the another liquid crystal layer being disposed between the liquid crystal layer and the exit polarizer; wherein, in the second mode, the liquid crystal molecules of the liquid crystal layer have a first liquid crystal alignment and the liquid crystal molecules of the another liquid crystal layer have a second liquid crystal alignment different from the first liquid crystal alignment.

The first and second liquid crystal alignment may be tilt alignments.

The tilt alignments do not need to extend through the entire thickness of the (respective) liquid crystal layer, but may extend only through a portion of the thickness of the (respective) liquid crystal layer. Thus, a bend state, a splay state or a twist profile may be used to provide the tilt alignments, in addition to uniform tilt states.

The first tilt alignment may be in an opposite direction, relative to the normal axis of the display, to the second tilt alignment. This provides an abnormal grey level curve for light propagating at large angles to the normal axis of the display, on both sides of the normal axis.

Alternatively, the first tilt alignment may be in the same direction, relative to the normal axis of the display, as the second tilt alignment and the first tilt alignment may have a different angle of tilt to the second tilt alignment. This provides a patterning of the grey level curve, and thereby improves privacy.

In the second state, the liquid crystal layer may further have at least a third region in which the liquid crystal molecules have a third liquid crystal alignment and a fourth region in which the liquid crystal molecules have a fourth liquid crystal alignment, the third and fourth liquid crystal alignments being different from one another and being different from the first and second liquid crystal alignments.

The liquid crystal layer may have a refractive index anisotropy of one sign and the display may further include an optical compensation layer having a refractive index anisotropy of an opposite sign. This allows a wide view mode to be obtained for liquid crystal alignment other than a horizontal alignment. The liquid crystal layer may have a positive refractive index anisotropy and the optical compensation layer may have a negative refractive index anisotropy. The liquid crystal layer may be a VAN liquid crystal layer.

In the first state, liquid crystal molecules of the at least one region of the liquid crystal layer may be aligned substantially perpendicular to the normal axis of the display.

For at least one angle in the first viewing angle range but outside the second viewing angle range, the grey level curve may be substantially flat. This further improves the privacy of the narrow view mode, as text cannot be read by an observer at a viewing angle at which the grey level curve is flat since there is no contrast between the text and the background.

The second viewing angle range may be within the first viewing angle range. The second viewing angle range may include the normal direction.

The second viewing angle range may have a bisector which is non-normal to the display.

The display may be arranged to display an indication when the molecules are in the second state. It may be arranged to display the indication in response to the content of data for display.

The display may further include an ambient light sensor for causing the display to provide the second viewing angle range when the ambient light is below a threshold.

The image display layer may be a liquid crystal display layer.

The display may be a vehicle display.

It is thus possible to provide a display whose viewing angle may be switched, for example, between a wide view mode and a narrow or private view mode. The first liquid crystal device may be used with a display device which can be of any suitable type and whose operation need not be changed in order to provide the wide and narrow view modes.

Such a display may be used, for example, in desktop monitors, mobile telephones and personal digital assistants (PDAs). Such an arrangement is simple to implement and may be manufactured by well-known and established manufacturing techniques. In some preferred embodiments of the present invention, the first liquid crystal device does not require any electrode patterning or internal structure, for example, to define pixels. If the first liquid crystal device has a single liquid crystal region for switching the viewing angle range across the whole of the display device, a very simple electrode pattern may be used and is easy to manufacture. Although the display may be switched between the first and second viewing angle ranges, the viewing angle may be varied continuously or in steps by, for example, applying the appropriate drive voltages to the first liquid crystal device.

Such displays may be used in applications requiring a "public" mode with a wide viewing angle for general use and a "private" mode with a narrow viewing angle so that, for example, private information may be read in public places.

Another application for such a display is in a vehicle dashboard. For example, the viewing angle of the display may be controlled so that a passenger or a driver is unable to view the display. Alternatively, the viewing angle may be controlled in order to reduce reflection of the display in windshields and windows, especially at night or in low light conditions. In order to provide automatic control, for example, a brightness sensor and a backlight brightness control may be provided.

In yet another application, the liquid crystal layer acts as a switchable compensation film. Displays such as liquid crystal displays are usually laminated with static compensation films to improve the viewing angle characteristics. Such known arrangements are generally arranged to give the best results in one direction, usually horizontally. For a display which can be rotated and viewed in landscape or portrait modes, it is advantageous to be able to switch a compensation film so as to give improved results depending on the display content.

Such displays may also be used in applications where two or more images are spatially multiplexed and displayed by the display device. For example, such a display may have a first mode in which one image is displayed across the display and a second mode in which two or more different images are displayed across the display in a spatially multiplexed manner. In the second mode, the displayed images may be stereoscopically related to provide an autostereoscopic display or may be entirely independent of each other to provide different views to different viewers. The different modes may require different optical compensation and a switchable compensator may be used to achieve this.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIGS. 2A and 2B show a display according to a preferred embodiment of the present invention in its private mode.

FIGS. 2C and 2D show the display of FIG. 2A in its public mode.

FIGS. 3A1-3A4 and 3B1-3B6 illustrate the principle of operation of a display according to a preferred embodiment of the present invention.

FIG. 5A is a schematic sectional view through a display of a further preferred embodiment of the present invention in its public mode.

DETAILED DESCRIPTION OF PREFERRED EMBODIMENTS

Figure 1A:
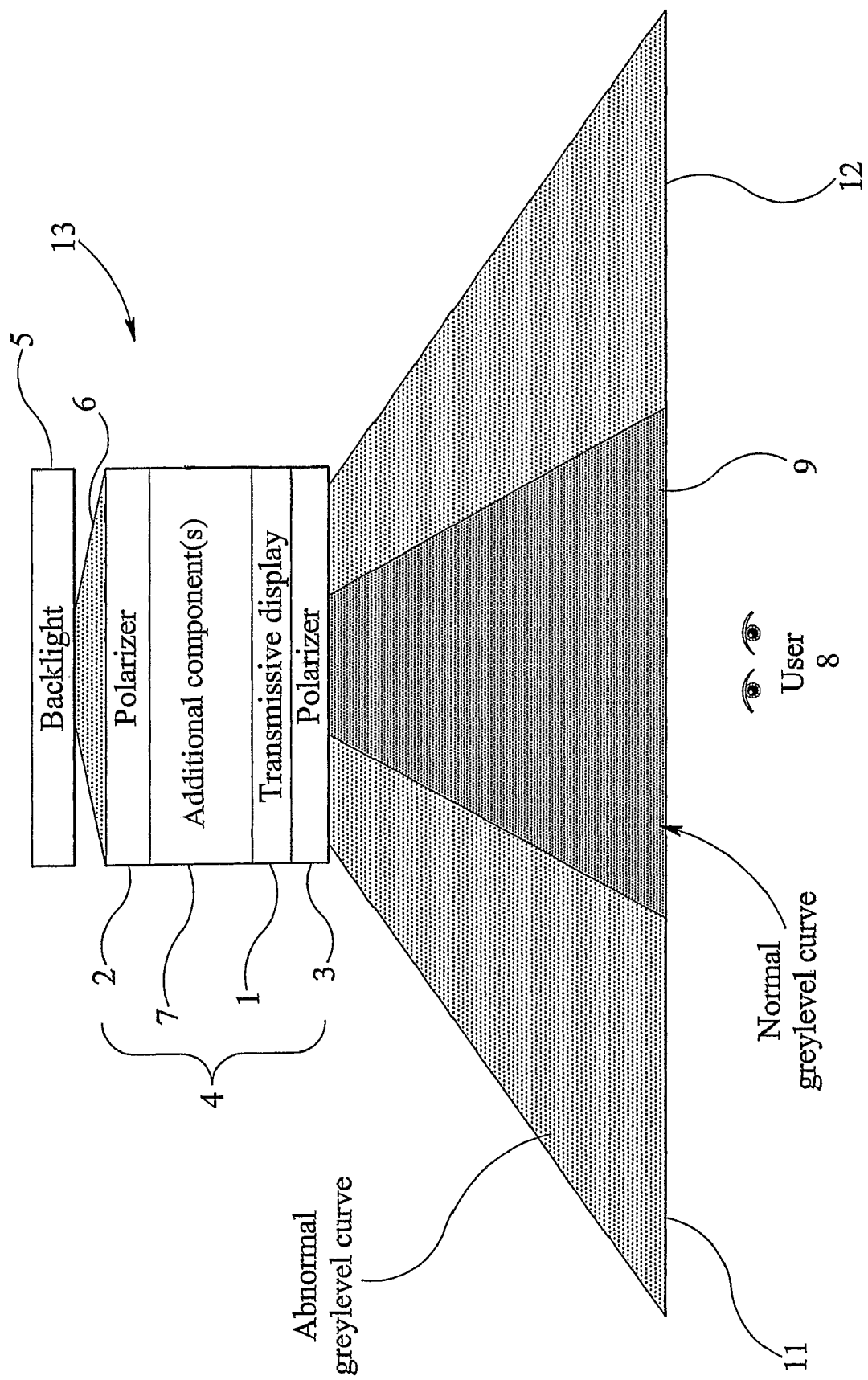
FIG. 1A is a schematic plan view of a display according to a first preferred embodiment of the present invention in its private mode.

FIG. 1A is a schematic plan sectional view of a display 13 according to a preferred embodiment of the present invention. The display preferably includes a transmissive image display layer 1 which can be driven to display a desired image. The image display layer 1 may be of a conventional type, which does not require any change in order to provide a display having a wide view mode and a narrow view mode. For example, the image display layer 1 may be a liquid crystal layer, and in particular may include a thin film transistor (TFT) liquid crystal panel that provides a pixelated full color or monochrome display in response to image data supplied to the display. However, any suitable display layer may be used.

The image display layer 1 is disposed between an entrance polarizer 2 and an exit polarizer 3. The polarizers 2, 3 and the image display layer 1 together constitute an image display device 4.

The display is illuminated by a backlight 5 which emits light with reasonable uniformity of intensity throughout a relatively wide angular distribution range as shown at 6. The backlight 5 may also be of conventional type as used to illuminate known displays.

The display includes one or more additional components, indicated generally at 7, disposed in the path of light from the backlight 5 to an observer 8. The one or more additional components 7 each provides angular light modulation, for example, changing the output of the display between a narrow angular light distribution 9 as shown in FIG. 1A and a wide angular light distribution 10 as shown in FIG. 1B.

Figure 1B:
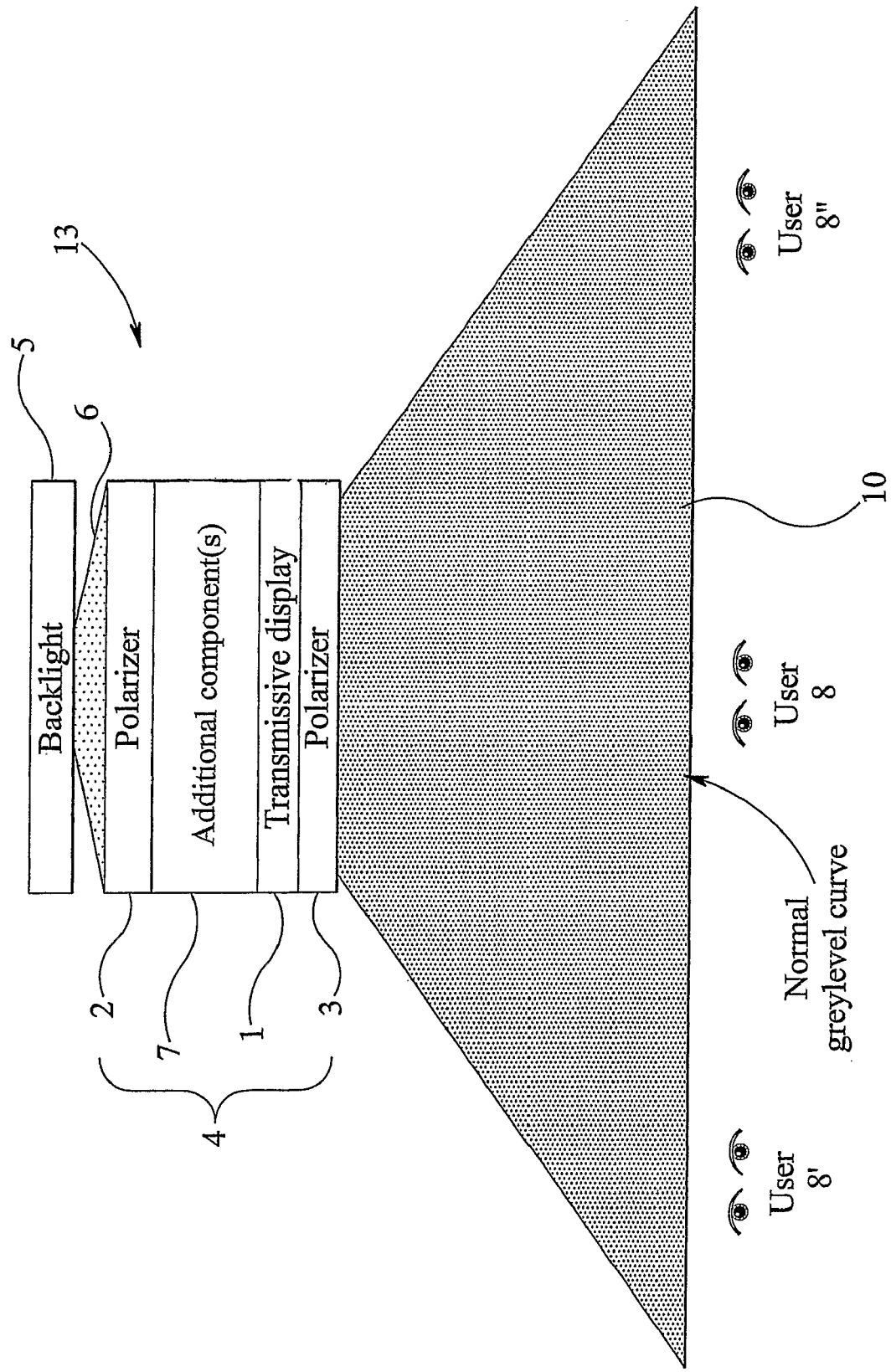
FIG. 1B shows the display of FIG. 1A in its public mode.

According to a preferred embodiment of the present invention, the one or more additional components each is able to switch the display between the narrow display mode of FIG. 1A in which the display has a narrow angular viewing range 9 and the wide display mode of FIG. 1B in which the display has a wide angular viewing range 10. The one or more additional components each is able to modify the viewing angle of the display by producing a "grey level curve" that, in the narrow display mode, is a function of the viewing angle. In the wide display mode, however, the grey level curve is substantially independent of the viewing angle. The display is switchable between the wide display mode and the narrow display mode by suitably controlling the one or more additional components 7. Thus, the present preferred embodiment of the present invention provides a display that can easily be switched between a "public mode" (the wide viewing mode) in which a displayed image can be seen and understood over a wide range of viewing angles and a "private mode" (corresponding to the narrow viewing mode) in which a displayed image can be seen and understood over only a narrow range of viewing angles.

Figure 6A:
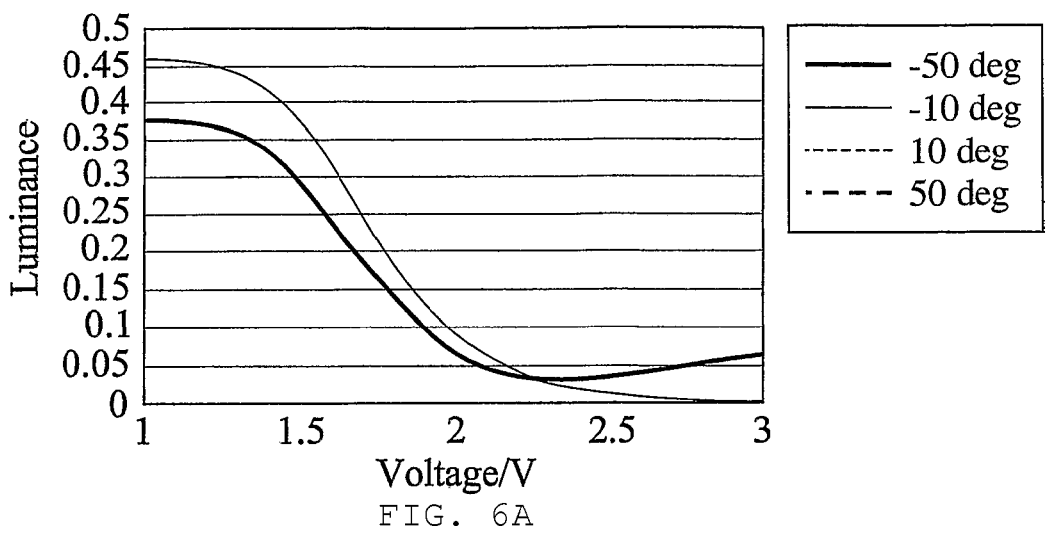
FIGS. 6A to 6C illustrate the operation of the display of FIG. 5A.

The "grey level curve" of an image display device is, as is well known, the characteristic curve of luminance of the display device against the applied voltage. (In the case of a transmissive display device, the luminance of the device is, for a backlight of constant intensity, proportional to the transmissivity of the device). A typical grey level curve is shown in FIG. 6A, and it can be seen that the maximum luminance (i.e., the "white state") is obtained for an applied voltage of around 1 voltage, and that increasing the applied voltage to around 3V leads to a state of substantially zero luminance, i.e., to the "black state". This is shown by the full black line in FIG. 6A, which corresponds to a viewing angle of about ±10° from the normal axis of the display. Thus, if a display having this grey level curve is operated by applying a voltage of either about 1V or about 3V, it can be operated in a white/black display mode. If intermediate voltages are applied, levels of luminance intermediate of the maximum and minimum luminance levels are obtained, and these are known as "grey levels". In most operations, the voltage applied to an image display device is controlled to obtain intermediate grey levels in addition to the states of maximum and minimum luminance. The grey level curve of FIG. 6A was obtained for a twisted nematic liquid crystal display device, but many display devices have a similar grey level curve.

It is known that a display device formed by a liquid crystal layer interposed between first and second linear polarizers will affect the transmission of light passing through the device. The device affects not only the intensity of light transmitted through the device, but also the angular distribution of intensity of light transmitted through the device. The angular distribution of intensity arises from a change in the polarization state of light which is dependent on the angle between the direction of propagation of the light and the normal axis of the display, and these angle-dependent changes in polarization are translated into angle-dependent variations in intensity when the light passes through the second polarizer. The change in polarization arising when light passes through the liquid crystal layer, and therefore the transmissivity of the display device, can be controlled by applying an electric field to the liquid crystal layer so as to re-orient the liquid crystal molecules and thereby change the optical effect of the liquid crystal layer.

The angular dependence of transmissivity of a liquid crystal display device, and hence on the intensity of light seen by an observer, has hitherto been regarded as a disadvantage. There has been considerable effort put into eliminating, or at least reducing, the dependence of intensity of a liquid crystal display on the viewing angle. For example, there is considerable literature on placing optical compensation films in the path of light through a liquid crystal display in order to reduce the dependence of the transmissivity of the display on the viewing angle. The present invention, in contrast, makes use of the variation in intensity with the viewing angle, and controls the grey level curve of the display to allow the display to have either a wide field of view in which a displayed image can be seen by many viewers or to have a narrow field of view in which a displayed image is seen by only one viewer or by a few viewers.

The additional components 7 of the display 13 of FIGS. 1A and 1B include at least one liquid crystal layer. The molecules of the liquid crystal layer (or the combination of liquid crystal layers, if the additional components comprise two or more liquid crystal layers) will be switchable between one liquid crystal state and another liquid crystal state, by the application or removal of an electric field. When the molecules are in one liquid crystal state, the grey level curve of the display does not significantly vary with viewing angle so that a normal grey level curve similar to that shown in FIG. 6A is seen throughout the wide viewing angle range 10, as shown in FIG. 1B, and the display is in a wide viewing mode. When the molecules of the one or more additional components each is switched to their other state, the grey level curve of the display varies with the viewing angle. As a result, the normal grey level curve is seen only in a narrow viewing angle range 9, as shown in FIG. 1A, and the display is in its narrow viewing mode. The liquid crystal states of the additional liquid crystal layer(s) 7 that produce the wide display mode and the narrow display mode will be referred to as the "wide state" and the "narrow state" respectively, for convenience.

There are many possible director orientations for the liquid crystal layer(s) of the additional components 7. The additional components 7 may, for example, include an untwisted nematic liquid crystal layer, a twisted nematic (TN) liquid crystal layer, a super twisted nematic (STN) liquid crystal layer, a vertically aligned nematic (VAN) liquid crystal layer, a hybrid aligned nematic (HAN) liquid crystal layer, an electrically compensated birefringence (ECB) liquid crystal layer, or an optically compensated bend (OCB) liquid crystal layer such as a pi-cell or a 180° twist pi-cell. The liquid crystal material is not, however, limited to nematic liquid crystal materials.

In general, it will be necessary to apply an electric field across the additional liquid crystal layer(s), in order to maintain one of the narrow or wide states. If a bi-stable liquid crystal layer is used, however, it will be necessary to apply a voltage only to switch the additional liquid crystal layer(s) from the wide state to the narrow state, or vice versa, and it would not be necessary to apply a voltage to maintain the liquid crystal layer(s) in either of the states. Use of a bi-stable liquid crystal layer would therefore reduce the power consumption of the display.

In the display of FIGS. 1A and 1B, light emitted by the backlight 5 passes through the entrance polarizer 2 and is then incident on the additional components 7 which, as explained above, include at least one liquid crystal layer. The additional liquid crystal layer(s), when switched to their wide state, transmit light with virtually no change to its polarization state, so that light leaving the additional liquid crystal layer(s) still has essentially the polarization state defined by the entrance polarizer 2. In their narrow state, however, the additional liquid crystal layer(s) produce a viewing angle-dependent change in the polarization state of this light. In this preferred embodiment, the additional liquid crystal layer(s) change the polarization state of light incident at high viewing angles, while the polarization state of light incident at low viewing angles is substantially unchanged. As a result, when the one or more additional liquid crystal layers each is in its narrow state, the polarization state of light input to the transmissive display layer 1 is the same as the polarization state defined by the input polarizer 2 only for low viewing angles. For high viewing angles, the polarization state of light input to the display layer 1 is not the same as the polarization state defined by the polarizer 2. Thus, the angular dependence of the polarization state of light incident on the display layer 1 is dependent on the electric field applied to the additional liquid crystal layer(s).

The light then passes through the transmissive display layer 1, the construction of which is unchanged and which operates normally. If the polarization state of light incident on the transmissive display layer 1 is virtually the same as the polarization state defined by the input polarizer 2. That is, if the polarization state of light was not significantly changed by passing through the additional liquid crystal layer(s), the display will have a standard grey level curve over a wide viewing angle range 10, as shown in FIG. 1B, and the display will be in its wide viewing mode. If, however, the polarization state of light incident on the transmissive display layer 1 is substantially different from the polarization state defined by the input polarizer, then the display will not appear normal because the grey level curve of the display will be altered at high viewing angles. As a result, the display will have a normal grey level curve only over a narrow range of viewing angles 9, as shown in FIG. 1A. For viewing angles outside the narrow viewing angle range 9, for example in the angular ranges 11 and 12 shown in FIG. 1A, the display will have an abnormal grey level curve, as will be described in more detail below, and the display will operate in a narrow display mode. Thus, the display is in either a wide viewing mode or a narrow viewing mode, dependent on the state of the addition liquid crystal layer(s).

The angular extent of the narrow viewing angle range 9 depends on the angular dependence of the change in polarization produced by the additional liquid crystal layer(s) in their narrow state. Typically, a viewing angle range of around 40° is desired in a private display mode. Usually the viewing window is symmetric about the normal axis of the display screen, in which case a typical viewing window would extend from approximately 20° on one side of the normal to approximately 20° on the other side of the normal.

Figure 1C:
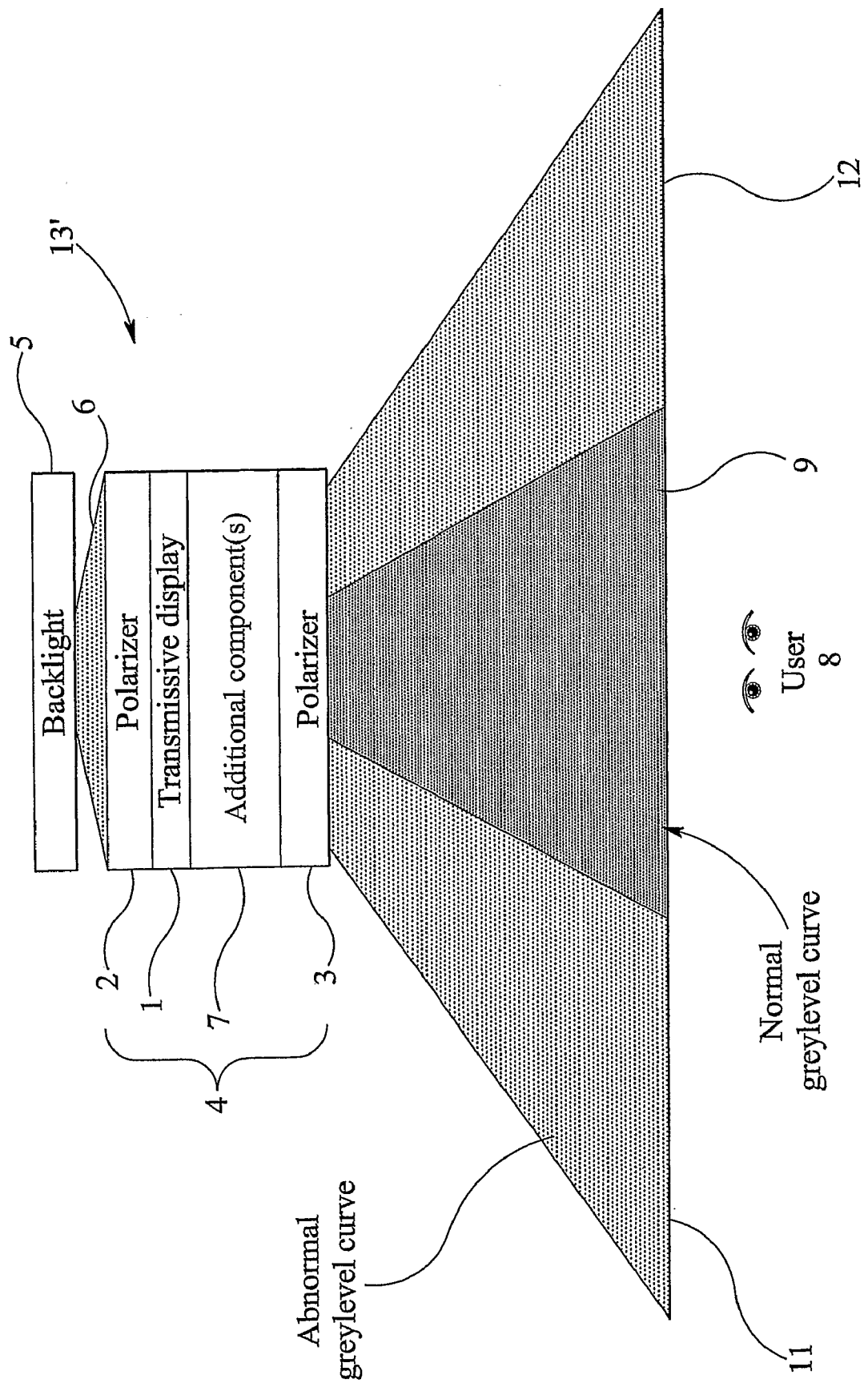
FIG. 1C is a schematic plan view of a display according to a second preferred embodiment of the present invention in its private mode.
Figure 1D:
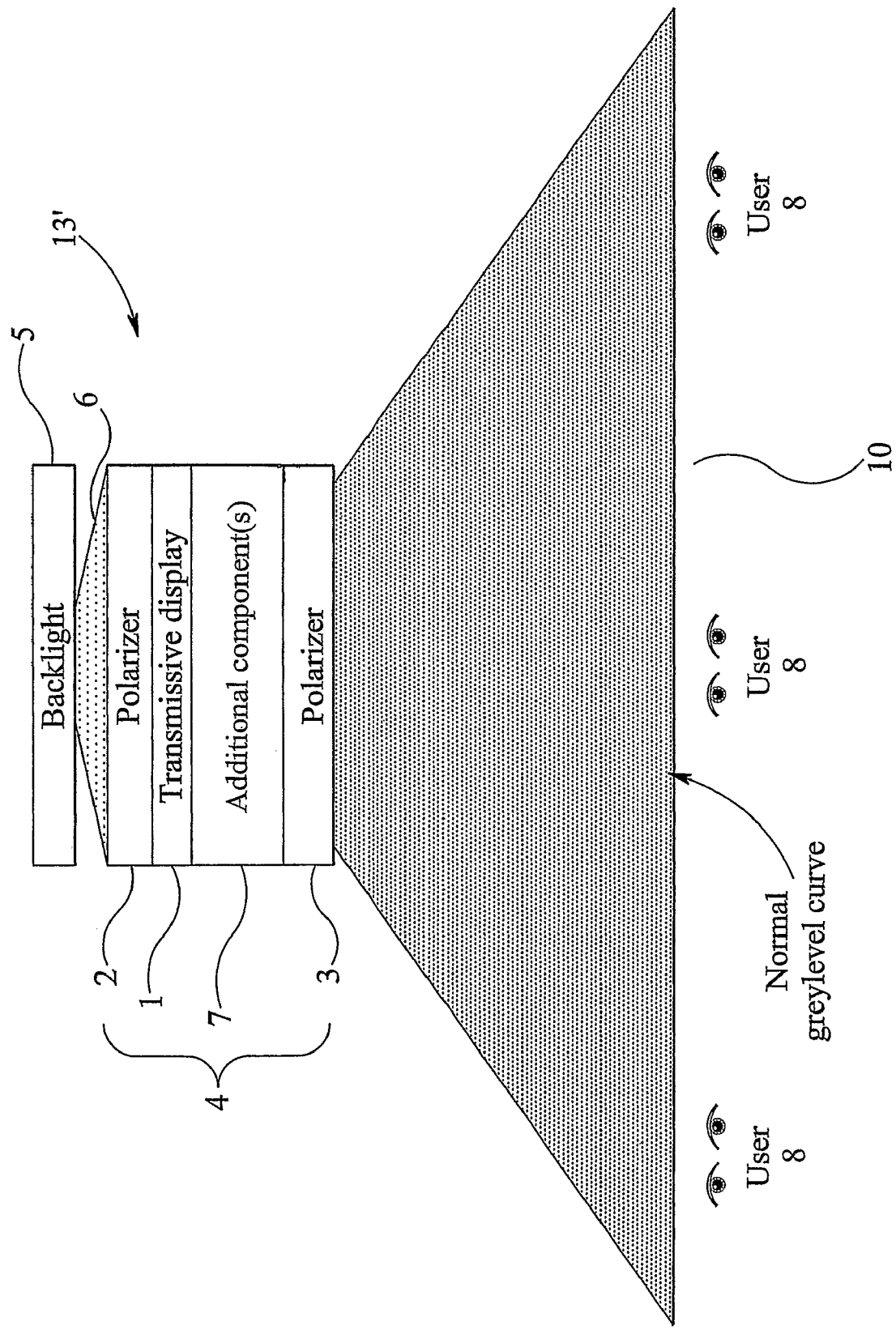
FIG. 1D shows the display of FIG. 1C in its public mode.

FIGS. 1C and 1D are schematic plan sectional views of a display 13' according to an alternative preferred embodiment of the present invention. The display 13 again preferably includes a display device 4 having a transmissive image display layer 1 disposed between an entrance polarizer 2 and an exit polarizer 3. The image display layer 1 may be any transmissive display layer such as, for example, a TFT liquid crystal layer.

The display 13' is illuminated by a suitable backlight 5.

The display 13' preferably is generally similar to the display 13 of FIGS. 1A and 1B, and again preferably includes additional components 7 that include at least one liquid crystal layer. In the display 13', however, the additional component(s) are provided between the image display layer 1 and the exit polarizer 3, rather than between the entrance polarizer 2 and the image display layer 1 as in the display 13 of FIGS. 1A and 1B.

In the display 13' of FIG. 1C, light from the backlight 5 passes through the input polarizer 2 and then passes through the image display layer 1. The polarization state of light emerging from each pixel of the image display layer 1 depends on the image data applied to that pixel. In a conventional display, the polarization state of light emerging from each pixel would be converted into a respective intensity upon transmission through the exit polarizer 3. In the display 13', however, light leaving the image display layer 1 passes through one or more additional liquid crystal layers 7 which, as explained with reference to FIGS. 1A and 1B above, may either transmit light with virtually no change to the polarization state or may induce a viewing angle-dependent change in the polarization state, for example, by changing the polarization state of light propagating at high viewing angles while leaving the polarization state of light propagating at low viewing angles substantially unaltered. Whether the additional liquid crystal layer(s) induce a change in the polarization state or transmit light with virtually no change to the polarization state depends on the electric field applied to the additional liquid crystal layer(s).

If the additional liquid crystal layer(s) have little or no effect on the polarization of light passing through it/them, the polarization state of light incident on the exit polarizer 3 will be virtually the same as the polarization state emerging from each pixel of the display layer 1. The display 13' will then have a normal grey level curve over a wide angular range 10, and a displayed image will be visible to many viewers 8, 8', 8". The display thus operates in a wide display mode or "public mode", as shown in FIG. 1D.

If, on the other hand, the additional liquid crystal layer(s) 7 alter the polarization state of light propagating at high viewing angles, the polarization state incident upon the exit polarizer 3 will, at high viewing angles, be significantly different from the polarization state emerging from the individual pixels of the image display layer. The display 13' therefore does not provide a normal display at high viewing angles, because the display has an abnormal grey level curve at high viewing angles. A normal grey level curve is seen only at low viewing angles, since the additional liquid crystal layer(s) 7 do not significantly change the polarization state of light propagating at angles close to the normal axis to the display. A displayed image is therefore visible only to a single user, and the display operates in a narrow display mode or "private mode". As in the preferred embodiment of FIGS. 1A and 1B, the angular extent of the narrow viewing angle range 9 is determined by the angle-dependent change in the polarization state induced by the additional liquid crystal layer(s) 7.

In order to induce a viewing angle-dependent change in the polarization state of light, it is necessary to use a liquid crystal mode in which the effective refractive index anisotropy (denoted as "$\Delta n$") changes significantly as a function of the viewing angle and/or in which the effective orientation of the optic axis of the liquid crystal layer is rotated with respect to the polarization direction as a function of angle. Moreover, if the additional liquid crystal layers is/are arranged such that either the refractive index anisotropy is small for light propagating along the normal axis and/or the effective orientation of the optic axis of the liquid crystal layer is not rotated with respect to the polarization direction for light propagating at normal incidence, the polarization state is substantially unaltered for light propagating at normal incidence, and a change in polarization state occurs only for light propagating at high viewing angles.

FIG. 2A is a schematic sectional view of one embodiment of a display 13 according to FIGS. 1A and 1B showing the components in more detail. The display 13 preferably includes an input polarizer 2, an image display layer 1, an additional liquid crystal layer 7 and an exit polarizer 3. In this preferred embodiment, the image display layer 1 is a twisted nematic ("TN") liquid crystal layer 1 disposed between transparent substrates (not shown). The TN liquid crystal layer 1 will in practice be incorporated in a TN liquid crystal panel, but other components of the panel, such as alignment surfaces for aligning the liquid crystal molecules 26 of the nematic liquid crystal layer 1 and electrode layers for applying an electric field across one or more pixels of the liquid crystal layer 1, may be conventional and are omitted from FIG. 2A for clarity.

FIG. 2A shows a transmissive display that, in use, will be illuminated by a backlight (not shown). The present invention may alternatively be applied to a reflective display in which one of the polarizers 2, 3 of FIG. 2A would be replaced by a reflector. If the reflector is not completely reflecting over its entire area (for example if the reflector contains a transmissive portion), a transflective display may be obtained.

The additional liquid crystal layer 7, in this preferred embodiment, is a liquid crystal layer that can be switched between a uniform tilted state shown in FIG. 2A and a uniform horizontal (zero tilt) state as shown in FIG. 2C. Again, the additional liquid crystal layer may in practice be incorporated in a liquid crystal panel, but other components of the panel, such as substrates, alignment surfaces for aligning the liquid crystal molecules 27 and electrode layers for applying an electric field, may be conventional and are omitted from FIG. 2A for clarity.

In the present application, the term "horizontal state" or "horizontal alignment" refers to a liquid crystal state in which the liquid crystal molecules are aligned perpendicular to the normal axis of the display. The term "vertical state" or "vertical alignment" refers to a liquid crystal state in which the liquid crystal molecules are aligned parallel to the normal axis of the display. The term "tilt state" or "tilt(ed) alignment" refers to a liquid crystal state in which the liquid crystal molecules are aligned at an angle of $(90-\theta)°$ to the normal axis (i.e., so that $\theta=0$ corresponds to a horizontal alignment and $\theta=90°$ corresponds to a vertical alignment), where $\theta \neq 0$ and $\theta \neq 90°$.

The liquid crystal layer 7 may be arranged with a 0° pre-tilt alignment surface, such that a horizontal alignment is stable when no voltage is applied across the liquid crystal layer 7. By using a positive dielectric anisotropy ($+\Delta\in$) liquid crystal material, a tilt alignment may be obtained by applying a suitable voltage across the liquid crystal layer. Alternatively, the device may have an alignment surface with a non-zero pre-tilt, so that a uniform tilt alignment is stable when no voltage is applied across the liquid crystal layer. In this case, by using a negative dielectric anisotropy ($-\Delta\in$) liquid crystal material, a horizontal alignment may be obtained by applying a suitable voltage across the liquid crystal layer.

Figure 2B:
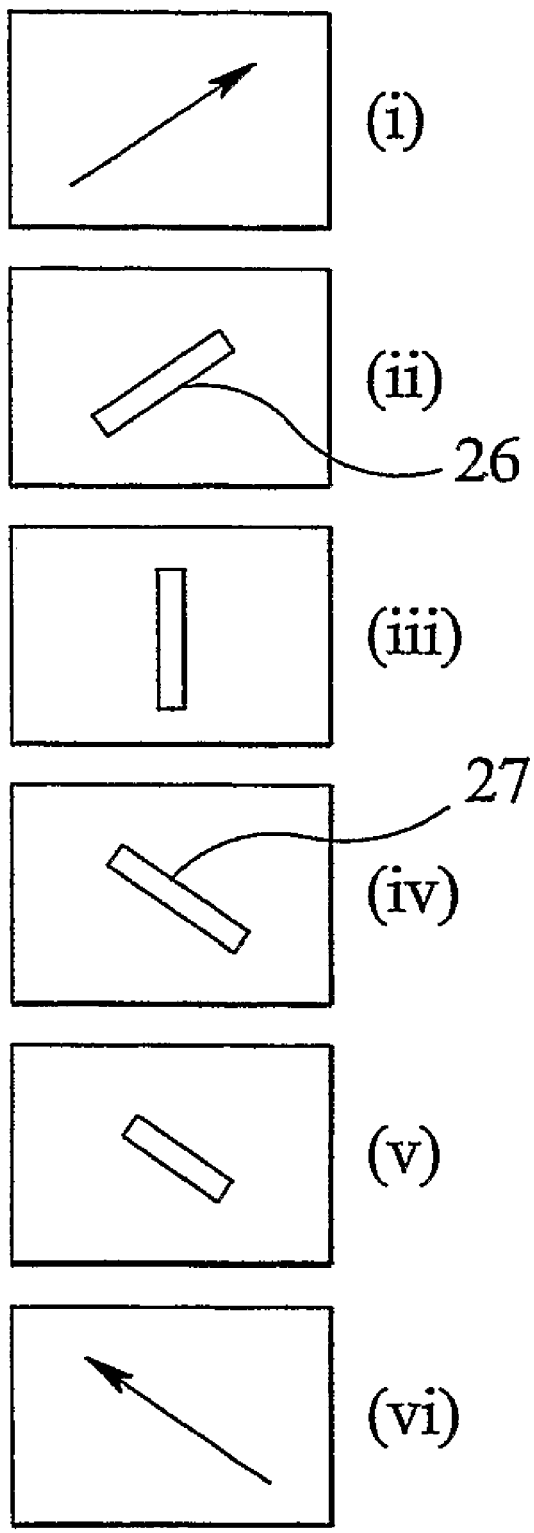

FIG. 2B illustrates the azimuthal orientation of the components of the display 13. View (i) shows the azimuthal orientation of the transmission axis of the entrance polarizer, and view (ii) shows that the azimuthal orientation of the molecules 26 of the TN liquid crystal layer 1 adjacent to the entrance polarizer 2 is substantially parallel to the transmission axis of the entrance polarizer. The TN liquid crystal layer 1 has a twist of approximately 90° across its thickness, and the azimuthal orientation of liquid crystal molecules adjacent to the exit polarizer 3 is therefore at approximately 90° to the azimuthal orientation of liquid crystal molecules adjacent to the input polarizer 2 as shown in view (iv). As a consequence of the twist of approximately 90° of the TN liquid crystal layer, the azimuthal orientation of molecules in the middle (in the thickness direction) of the TN liquid crystal layer, shown in view (iii) is at approximately 45° to the transmission axis of the entrance polarizer.

The azimuthal orientation of liquid crystal molecules 27 in the additional liquid crystal layer 7 is shown in view (v), and the azimuthal orientation of the transmission axis of the exit polarizer 3 is shown in view (vi). As can be seen, they are both arranged to be substantially parallel to the azimuthal orientation of liquid crystal molecules at the surface of the TN liquid crystal layer adjacent to the exit polarizer 3.

The azimuthal orientations shown in FIG. 2B are arranged such that light propagating along the normal axis of the display, and that is polarized either parallel to or perpendicular to the azimuthal orientation of the additional liquid crystal layer 7, will experience no change to its polarization state on passing through the additional liquid crystal layer 7. These polarization directions correspond to the black and white states of the display, and the intensity upon leaving the exit polarizer 3 will be as intended by the TN liquid crystal layer 1. If the light leaving the TN liquid crystal layer is intended to represent a mid-grey scale, then the polarization state of the light will not be fully parallel or fully perpendicular to the azimuthal orientation of the molecules of the additional liquid crystal layer 7. However, while the elliptical nature of the polarization will be changed by the additional liquid crystal layer 7, the proportion of light polarized parallel to and polarized perpendicular to the azimuthal direction of the liquid crystal molecules of the additional liquid crystal layer 7 will not change and the intensity upon leaving the exit polarizer 3 will therefore be as intended by the TN liquid crystal layer 1.

The effective refractive index anisotropy, or "effective $\Delta n$" of the additional liquid crystal layer 7 is calculated by taking a cross section, perpendicular to the propagation direction of light, through the index ellipsoid of the additional liquid crystal layer 7. This is shown in FIGS. 3A1-3A4. FIGS. 3A1 and 3A2 illustrate light propagating from the left and from the right, in the case where the molecules of the liquid crystal layer 7 are tilted with respect to the normal axis of the display (corresponding to the mode shown in FIG. 2A). FIGS. 3A3 and 3A4 show light propagating from the left and from the right respectively, for the case where the molecules of the additional liquid crystal layer 7 are at 90° relative to the normal axis of the display, corresponding to the mode shown in FIG. 2C. FIGS. 3A1 and 3A2 show that, when the molecules of the additional liquid crystal layer 7 are tilted, light incident from the left experiences a small effective $\Delta n$, whereas when light is incident from the right the effective $\Delta n$ is large. The additional liquid crystal layer 7 shown in FIG. 2A therefore produces an effective $\Delta n$ that is dependent on the angle of propagation of light, being small for light propagating from the left and being large for light propagating from the right. The display mode of FIG. 2A is thus a narrow display mode, and a viewer viewing the display from a direction to the left of the normal axis, for example, the viewer 8', will see an abnormal grey level curve, as a consequence of the high effective $\Delta n$ generated as shown in FIG. 3A2. An observer viewing the display along the normal direction or from the right of the normal axis, such as the viewers 8, 8" of FIG. 2A, will, however, see a normal grey level curve since the additional liquid crystal layer produces a low effective $\Delta n$ for these viewing angles.

FIG. 2C shows the display 13 of FIG. 2A, but with the additional liquid crystal layer switched so that liquid crystal molecules 27 are oriented substantially perpendicular to the normal axis of the display, in a horizontal alignment. FIG. 2D shows the azimuthal orientation of the components, and it can be seen that these are unchanged from FIG. 2B. The liquid crystal layer 7 has the same sign of retardation in the horizontal alignment of FIG. 2C as it does in the tilt alignment of FIG. 2A.

When the molecules of the additional liquid crystal layer 7 are oriented substantially perpendicular to the normal axis of the display, the additional liquid crystal layer produces little or no change in the polarization state of light propagating from the left (FIG. 3A3), of light propagating from the right (FIG. 3A4) or of light propagating along the normal axis. When the molecules of the additional liquid crystal layer are oriented perpendicular to the normal axis, as shown in FIG. 2C, therefore, a normal grey level curve can be seen over a wide viewing angle range. The observers 8, 8' and 8" will all experience a normal grey level curve, and the display is then in its wide viewing mode.

FIG. 3B1-3B6 shows the cross-section of the refractive index ellipsoid 15, as encountered by light propagating through the additional liquid crystal layer 7. FIG. 3B1 to 3B3 show the refractive index ellipsoid of liquid crystal molecules when the additional liquid crystal layer 7 is placed in the uniform tilted state shown in FIG. 2A, and FIGS. 3B4 to 3B6 show the refractive index ellipsoid when the additional liquid crystal layer 7 is in the uniform zero tilt state shown in FIG. 2C. FIGS. 3B1 and 3B4 represent light propagating from the left of the optic axis, at an angle of −30° relative to the optic axis, (i.e., corresponding to FIGS. 3A1 and 3A3). FIGS. 3B2 and 3B5 represent light propagating along the normal axis, and FIGS. 3B3 and 3B6 represent light propagating from the right of the normal axis, at an angle of +30° to the normal axis (and correspond with FIGS. 3A2 and 3A4). FIGS. 3B1 to 3B6 also show the polarization direction of the incident light after passing through the image display layer 1, and this is represented by the arrow 14. The polarization direction 14 shown in FIGS. 3B1 to 3B6 is the effective polarization direction for a white display level, that is meant to pass through the exit polarizer 3 of FIGS. 2A and 2C with minimal attenuation.

FIG. 3B3 shows that, when the incident light is propagating at 30° in the lateral direction from the normal direction (i.e., corresponding to an observer who is viewing the display from a position that is laterally displaced from the normal axis of the display) the effective refractive index anisotropy (as represented by the cross-section, perpendicular to the propagation direction of the light, of the refractive index ellipsoid) is large, and the angle between the polarization direction of the light and the optic axis of the liquid crystal molecules is also large (the optic axis of the liquid crystal molecules corresponds to the major axis of the refractive index ellipsoid). The combination of a large Δn, and a large angle between the polarization direction and the optic axis is effective to change the polarization state of the light, such that some of the light will now be absorbed by the exit polarizer 3. A similar change will be made to light of any polarization state incident at an angle of +30° to the normal direction, and the shape of the grey level curve is therefore changed. An observer positioned to the left of the normal axis and viewing the display at a viewing angle of 30° will therefore see an abnormal grey level curve.

When the light incident on the additional liquid crystal layer 7 propagates along the normal axis, the light will still experience a relatively large Δn. However, the angle between the polarization direction of the light and the optic axis of the molecules of the additional liquid crystal layer is now zero, as shown in FIG. 3B2. There is therefore no change to the polarization state. This applies to light of other polarization states, intended to produce the black level or intermediate grey levels. The grey level curve experienced along the normal axis is therefore unchanged.

When the light incident on the additional liquid crystal layer 7 is propagating at an angle of −30° relative to the normal direction, the effective Δn experienced by the light is small as shown in FIG. 3B1. Thus, even though the angle between the polarization direction of the light and the optic axis of the molecules of the liquid crystal layer is relatively large, the low Δn means that there is negligible change in the polarization state of the light. This applies to light of other polarization directions, intended to give other grey levels. Thus, an observer viewing the display from the right of the normal axis, at a viewing angle of 30° (as represented by "observer 8" in FIG. 2A will therefore experience a normal grey level curve. This preferred embodiment therefore provides privacy, since a viewer to the left of the normal axis such as the observer 8' in FIG. 2A will see an abnormal grey level curve. A viewer viewing the display at normal incidence (the observer 8 in FIG. 2A) or an observer positioned to the right of the normal axis (the observer 8") will see a normal grey level curve, and will thus perceive virtually no change to the displayed image.

When the molecules of the additional liquid crystal layer 7 have their zero tilt state of FIG. 2C, light propagating at ±30° relative to the normal axis see a low Δn, as shown in FIGS. 3B4 and 3B6. Light propagating along the normal axis will again see a large Δn, but, as shown in FIG. 3B5, the angle between the polarization direction of the light and the optic axis of the molecules of the liquid crystal layer is zero. Thus, there will be no significant change in the polarization state for any of the angles of incidence shown in FIG. 3B, and normal grey level curves will be observed for all angles of incidence shown in FIG. 3B thereby providing a wide display mode.

FIGS. 2B and 2D show that the azimuthal direction of the liquid crystal molecules of the additional liquid crystal layer 7 is parallel to the transmission axis of the exit polarizer. That is, in the tilt alignment of FIG. 2A, the liquid crystal molecules of the additional liquid crystal layer 7 are parallel to a plane defined by the normal axis of the display and the transmission axis of the exit polarizer 3. However, it is possible for the liquid crystal molecules of the additional liquid crystal layer 7, in the narrow view mode tilt alignment of FIG. 2A, to be parallel to any one of the following planes:

1) a plane defined by the normal axis of the display and the absorption axis of the exit polarizer 3;
2) a plane defined by the normal axis of the display and the transmission axis of the exit polarizer 3;
3) a plane defined by the normal axis of the display and the absorption axis of the entrance polarizer 2; or
4) a plane defined by the normal axis of the display and the transmission axis of the entrance polarizer 2.

Aligning the liquid crystal molecules parallel to one of these planes in the tilt state of FIG. 2A ensures that, in the narrow view mode, an observer viewing the display along the normal axis of the display experiences a normal grey-level curve.

In the case of a reflective display having only one polarizer there will be two possible azimuthal orientations for the liquid crystal molecules of the additional liquid crystal layer 7. In the case of a transmissive display, there are in principle four possible azimuthal orientations for the liquid crystal molecules of the additional liquid crystal layer 7, although if the transmission axis of the entrance polarizer 2 is aligned either parallel to or perpendicular to the transmission axis of the exit polarizer (as will often be the case), there will be only two different possible azimuthal orientations for the liquid crystal molecules.

It should be noted that, in the narrow view mode, the display will have a narrow viewing angle in the direction perpendicular to the plane of the liquid crystal molecules, but will have a wide viewing angle in the direction parallel to the plane of the liquid crystal molecules. If the display is oriented such that, in use, the plane of the liquid crystal molecules in the narrow view mode extends vertically, this will provide adequate privacy in many applications, since it is often the case that providing privacy in the lateral direction is more important than providing privacy in the vertical direction. However, if it is desired to provide privacy in both lateral and vertical directions, or if the display is not oriented such that the plane of the liquid crystal molecules in the narrow view mode extends vertically, two liquid crystal layers superposed over one another may be used. By arranging the plane of the liquid crystal molecules in the narrow view mode in one layer to be at an angle to (preferably at approximately 90° to) the plane of the liquid crystal molecules in the other layer, it is possible to obtain privacy in both lateral and vertical directions.

Figure 4A:
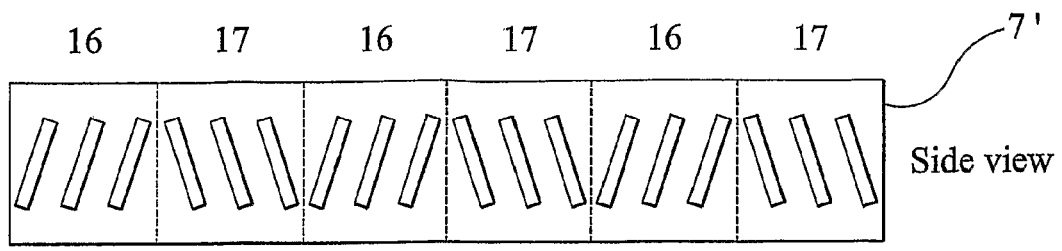
FIGS. 4A to 4E illustrate modifications of the preferred embodiment of FIG. 2A.

In the narrow display mode illustrated in FIG. 2A, an image is displayed to an observer 8 viewing the display along the normal axis and also to an observer 8" positioned to the right of the normal axis. In some applications it is desirable for the image to be displayed over an even smaller angular range, so that it is visible to only one observer such as, for example, the observer 8 viewing the display along the normal axis. One way of achieving this is to use an additional liquid crystal layer 7 that is patterned so that, in its narrow mode, it has at least a first region in which the liquid crystal molecules adopt one liquid crystal state and a second region in which the liquid crystal molecules adopt a second different liquid crystal state. One way of achieving this is shown in FIG. 4A. This is a cross-section of liquid crystal layer which, in its tilted state, has first regions 16 in which the liquid crystal molecules adopt a first tilt state and second regions 17 in which the liquid crystal molecules adopt a second tilt state that is different to the tilt state adopted in the first regions 16. Liquid crystal molecules in the first tilt state are tilted in an opposite direction, relative to the normal axis, to liquid crystal molecules in the second tilt state. The second regions 17 provide an abnormal grey level curve to an observer 8' viewing the display from the left of the normal axis, as explained with reference to FIG. 2A described above. The first regions 16 provide, in an exactly corresponding manner, an abnormal grey level curve for an observer 8" who is positioned to the right of the normal axis of the display.

Figure 4B:
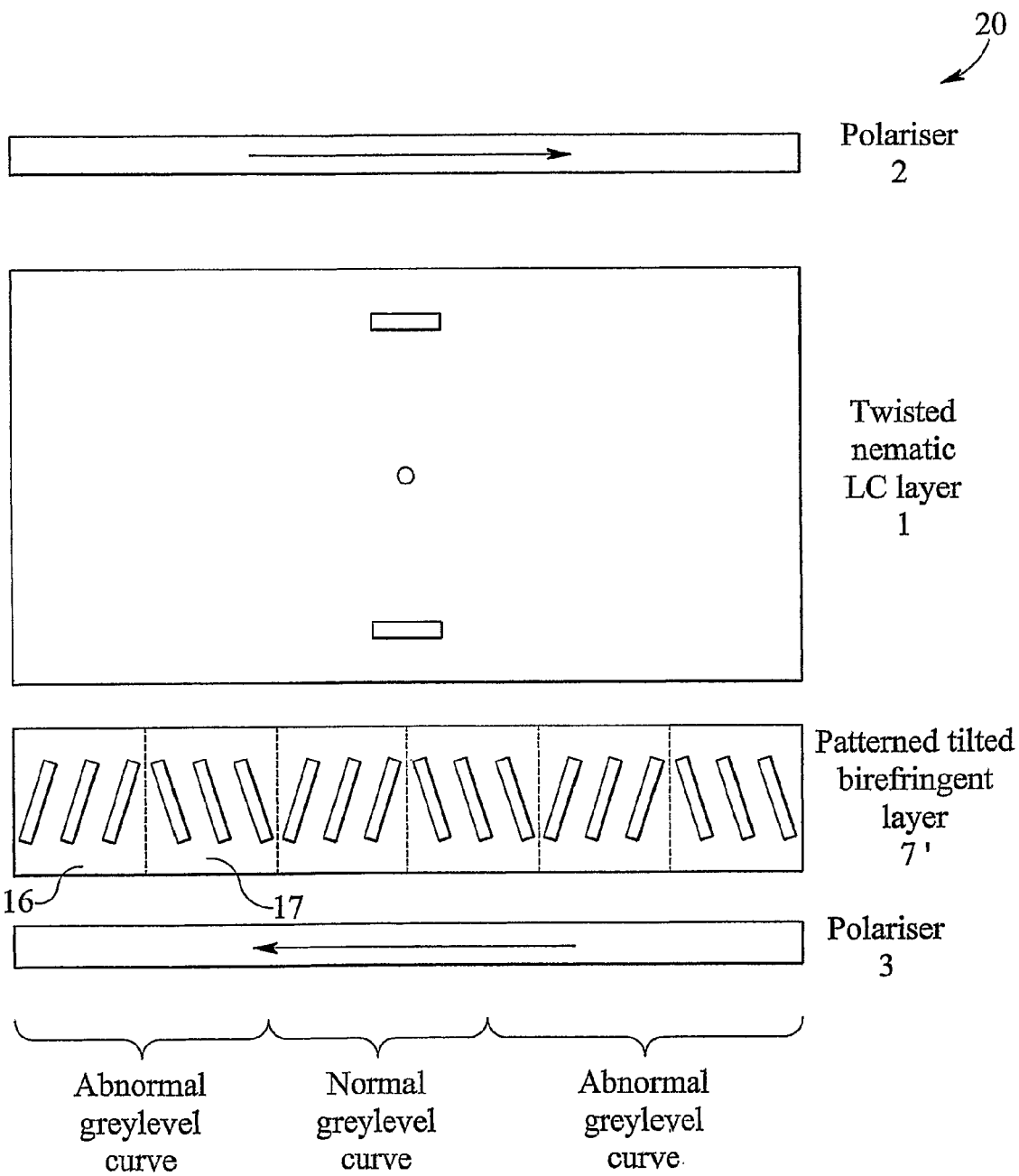

FIG. 4B is a sectional view of a display 20 that incorporates the patterned tilt liquid crystal layer 7' of FIG. 4A. Apart from the substitution of the patterned liquid crystal layer 7' for the uniform tilted liquid crystal layer 7 of FIG. 2A, the display 20 of FIG. 4B corresponds generally to the display of FIG. 2A, and its description will not be repeated here.

Figure 4C:
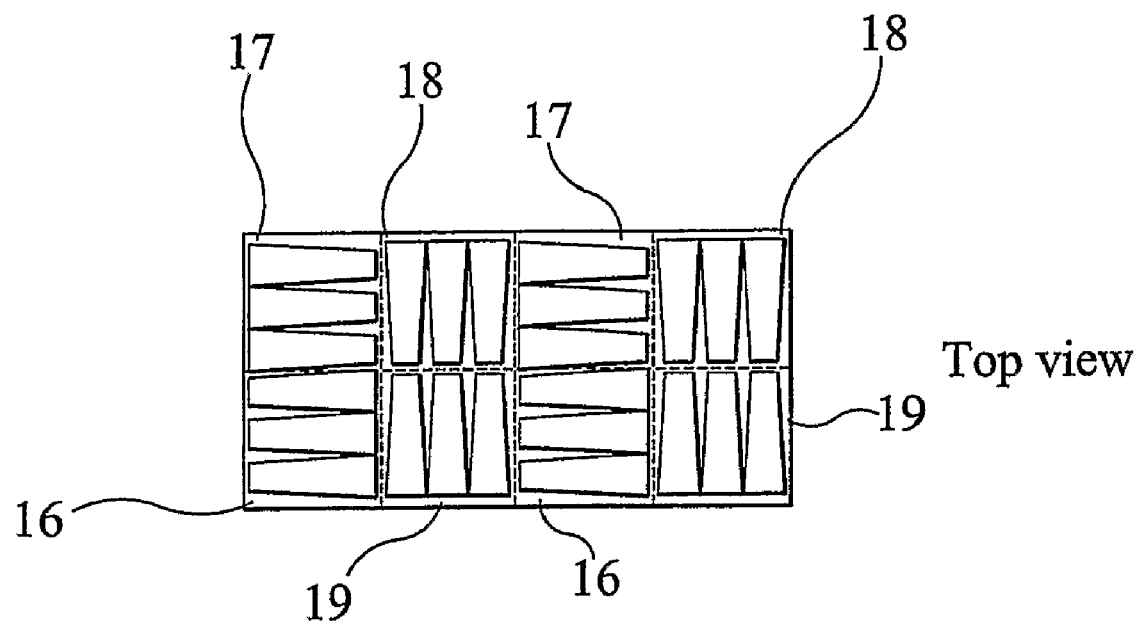

To obtain a wide display mode, the patterned tilt liquid crystal layer 7' of the display 20 is switched so that the liquid crystal molecules in all first and second regions 16, 17 are substantially perpendicular to the normal axis of the display. A wide display mode is then obtained as explained above with reference to FIG. 2C.

Where a patterned liquid crystal layer is used as the additional liquid crystal layer 7, the present invention is not limited to the liquid crystal layer being patterned to have only two different liquid crystal states. As an example, FIG. 4C is a plan view of a liquid crystal layer which is patterned so as to provide, in its narrow mode, regions in which four different liquid crystal states exist. In addition to the regions 16, 17 of FIG. 4A, third regions 18 and fourth regions 19 exist, with the liquid crystal state in each of the regions 16, 17, 18, 19 being different from one another when the liquid crystal layer is switched to its narrow mode. Liquid crystal molecules in the third regions 18, 19 are oriented in azimuthal directions that are opposite to one another, and that are perpendicular to the azimuthal directions of liquid crystal molecules in the first and second regions 16, 17. The present preferred embodiment is not limited to only four different liquid crystal states, and five or more different liquid crystal states could be provided.

A liquid crystal layer having first and second regions of patterned tilt, as in the liquid crystal layer 7' of FIGS. 4A and 4B can provide a viewing angle range that is restricted along one dimension. For example, the viewing range may be restricted in the lateral direction, but it will be unrestricted in the vertical direction. Use of a liquid crystal layer patterned as shown in FIG. 4C allows the viewing range of a displayed image to be restricted in two perpendicular dimensions, for example, in both the lateral and vertical dimensions. A displayed image can be perceived only from a narrow range of viewing angles, which is substantially rotationally symmetric about the normal axis of the display, and this provides improved security by making it harder for an unwanted observer to see the image.

A patterned liquid crystal layer as shown in FIG. 4A or 4C may be obtained by any conventional technique. For example, one or more patterned alignment surfaces may be disposed adjacent the upper and/or lower surface of the additional liquid crystal layer. Additionally or alternatively, one or more patterned electrodes may be provided adjacent to the upper and/or lower surfaces of the additional liquid crystal layer so that regions of the additional liquid crystal layer may be addressed independently from one another.

It should be noted that patterning the liquid crystal layer as shown in, for example, FIG. 4A or FIG. 4B can further enhance privacy of a displayed image, by superposing the pattern over the original image. One possible drawback with the preferred embodiments described so far is that, if the grey level curve should change uniformly over the entire area of the display, then an image that includes text would be displayed using abnormal colors or with inverted contrast, but the text might still be readable. Where a pattern is superposed over the displayed image, when a patterned liquid crystal layer is used as the additional liquid crystal layer, the pattern is superposed over the text and the text would be broken up further by the pattern.

Even further privacy can be achieved by arranging for slightly different liquid crystal states to exist in, for example, one of the first regions 16 and another of the first regions 16. As an example, where the additional liquid crystal layer adopts a tilt state in its narrow state as in FIG. 4B, the angle of tilt may vary from one of the first regions 16 to another of the first regions 16 (provided that the liquid crystal molecules in all the first regions 16 are tilted on the same side of the normal axis). Similarly, the angle of tilt may vary from one of the second regions 17 to another of the second regions 17 (provided that the liquid crystal molecules in all the second regions 17 are tilted on the same side of the normal axis as one another). Obtaining different angles of tilt in different ones of the first or second regions can be obtained by use of a suitable alignment surface, or by arranging an electrode layer to apply different electric fields across different ones of the first or second regions. Providing different first regions with different angles of tilt causes a further variation of the grey level curve across the panel, and this can enhance the privacy of a displayed image further. This preferred embodiment may be particularly effective when used in connection with moving images, which are particularly difficult to make private because the human eye is adapted to filter out regular patterns.

In a display in which different angles of tilt in different ones of the first or second regions are obtained by use of an electrode layer to apply different electric fields across different ones of the first or second regions, it is possible for the tilt angles of the regions to be varied over time. This leads to time-varying grey level curves in the viewing regions where abnormal grey level curves are seen, and so makes it harder for an observer in a viewing region where abnormal grey level curves are seen to make out a displayed image.

Figure 4D:
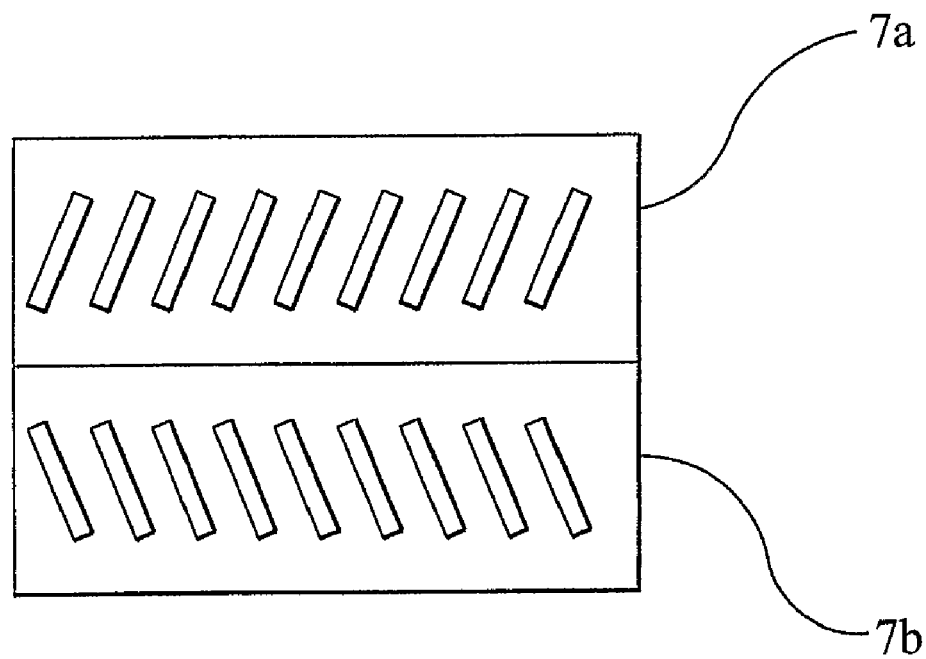

Another way of obtaining an abnormal grey level curve in more than one direction is to use two similar liquid crystal layers stacked one on top of the other as shown in FIG. 4D, which is sectional view of two liquid layers 7a, 7b, one stacked on the other. Each of the liquid crystal layers 7a, 7b shown in FIG. 4D has, when the liquid crystal molecules are switched to the narrow state, a uniform tilt state over substantially its entire area. Liquid crystal molecules in the first liquid crystal layer 7a are tilted in a direction opposite to the direction of tilt of liquid crystal molecules in the second layer 7b.

Figure 4E:
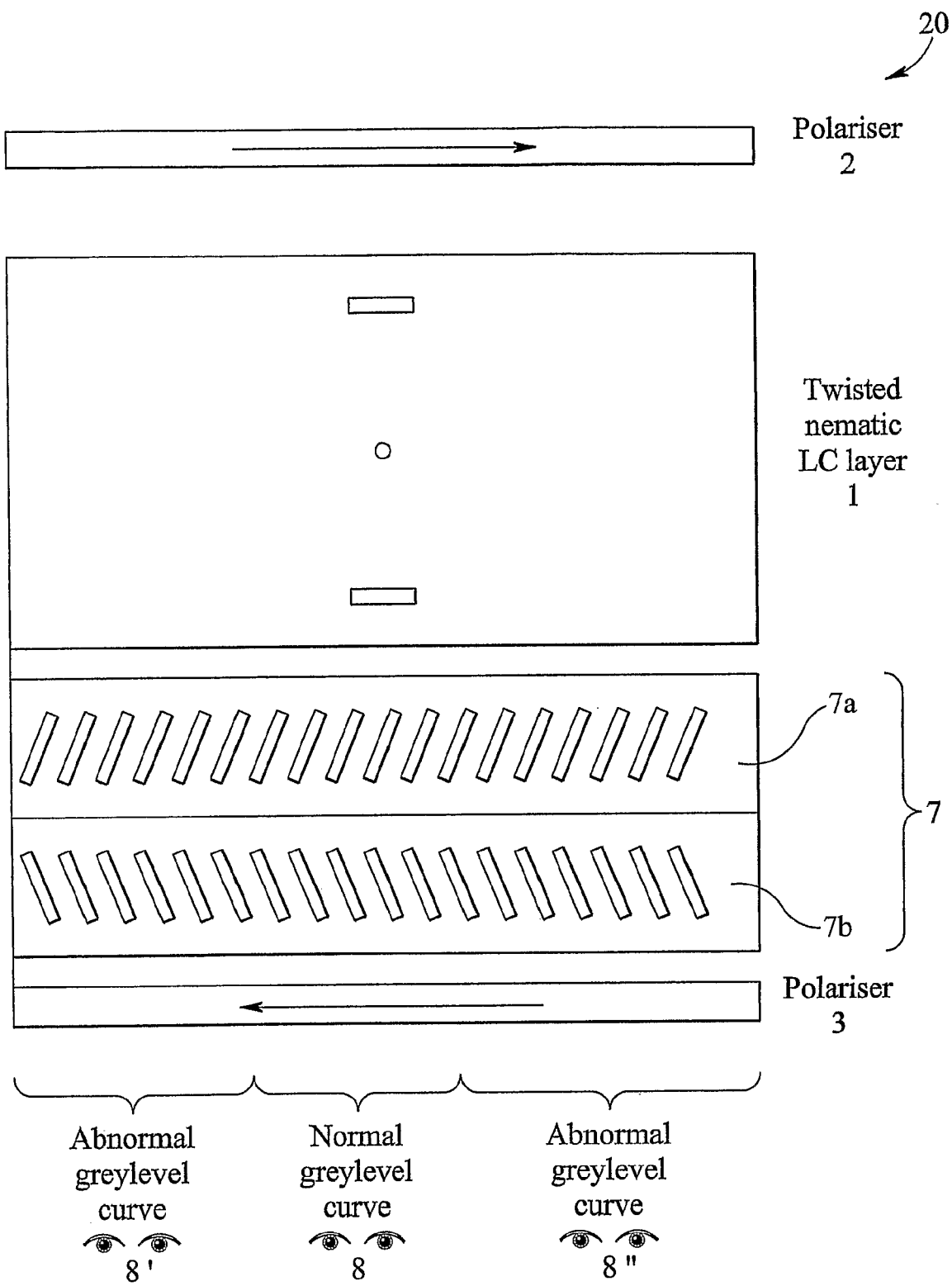

FIG. 4E is a schematic sectional view of a display 21 incorporating the two stacked liquid crystal layers 7a, 7b as the additional liquid crystal layers. The additional liquid crystal layers 7a, 7b may in practice be incorporated in one or two liquid crystal panels, but other components of the panel(s), such as substrates, alignment surfaces for aligning the liquid crystal molecules and electrode layers for applying an electric field, may be conventional and are omitted from FIG. 4E for clarity. The remaining components of the display 21 correspond to those of the display of FIG. 2A, and their description will not be repeated. The upper layer 7a provides an abnormal grey level curve directed to an observer 8" positioned to the right of the normal axis of the display. The lower liquid crystal layer 7b provides, in its narrow mode, an abnormal grey level curve directed to an observer 8' positioned to the left of the normal axis. As a result, a normal grey level curve is perceived only in a narrow viewing angle region around the normal axis and including the observer 8.

To obtain a wide viewing angle mode, both liquid crystal layers 7a, 7b are switched to have a uniform 0° tilt state, so that the liquid crystal molecules of each layer 7a, 7b are arranged perpendicular to the normal axis of the display in a horizontal alignment.

In the preferred embodiment of FIG. 4E, it would be possible to arrange the electrodes that address the additional liquid crystal layers 7a, 7b to make it possible to switch one of the liquid crystal layers 7a, 7b independently from the other, to obtain varying regions of normal grey level curve.

The tilt states in the first and second regions 16, 17 of the liquid crystal layer 7' of FIG. 4A, or of the first and second liquid crystal layers 7a, 7b of FIG. 4D may be equal and opposite tilt states. That is, the magnitude of the tilt angle, relative to the normal axis of the display is the same in both regions, but liquid crystal molecules in one region (or one liquid crystal layer) are tilted in the opposite direction to liquid crystal molecules in the other region (or other liquid crystal layer). This provides an angular viewing range, in the narrow display mode, which is approximately symmetric about the normal axis. Alternatively, the magnitude of the tilt angle could be different between the first liquid crystal region 16 and the second liquid crystal region 17, or between the first liquid crystal layer 7a and the second liquid crystal layer 7b, and this would provide provides an angular viewing range, in the narrow display mode, which is not symmetric about the normal axis.

In the preferred embodiment of FIGS. 2A to 2D, the tilt state in the narrow view mode has a uniform tilt alignment across the thickness of the additional liquid crystal layer 7. However, this is not essential for the present invention, and it is necessary only that a tilt state exists across some portion of the thickness of the liquid crystal layer 7 in the narrow view mode.

Figure 5B:
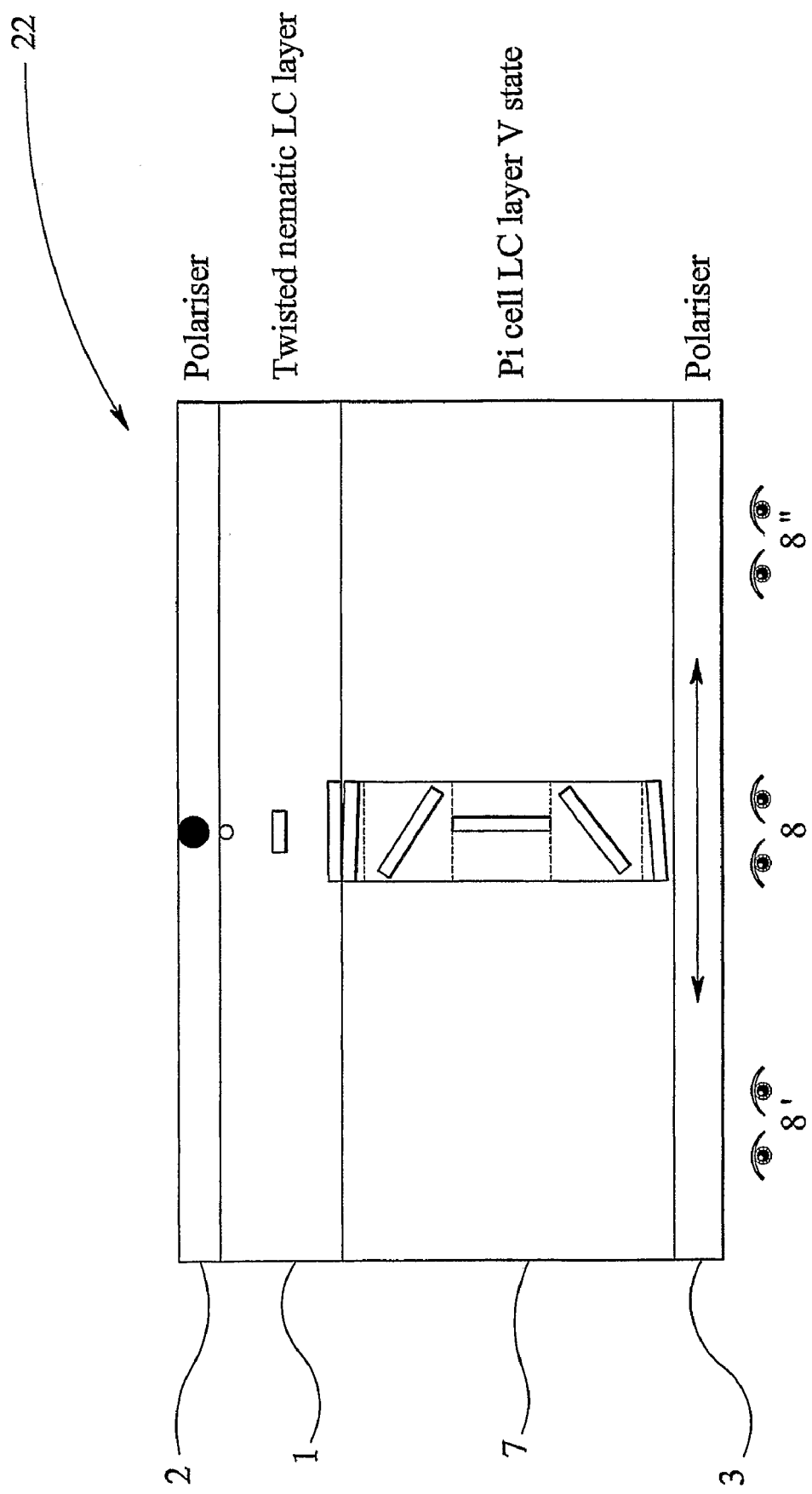
FIG. 5B is a schematic sectional view through the display of FIG. 5A in its private mode.

In the liquid crystal layer 7' of the display 20 of FIG. 4B each liquid crystal region 16, 17 extends through the thickness of the liquid crystal layer. In a further preferred embodiment of the present invention, the first and second regions having different liquid crystal states are provided at different depths within a single liquid crystal layer. This preferred embodiment is illustrated in FIGS. 5A and 5B, which are schematic sectional views of a display 22 according to this preferred embodiment of the invention.

The display 22 includes an entrance polarizer 2, a transmissive display layer 1, and an exit polarizer 3. An additional liquid crystal layer 7 is disposed between the display layer 1 and the exit polarizer 3. In the preferred embodiment shown in FIG. 5A, the display layer 1 is a TN liquid crystal layer, but the present invention is not limited to this particular image display layer.

The additional liquid crystal layer 7 of the display 22 is a pi-cell liquid crystal layer. A pi-cell is described by P. J. Bos et al. in "Mol. Cryst. Liq. Cryst.", Vol. 113, pp 329-339 (1984). As is known, a pi-cell includes a nematic liquid crystal material disposed between first and second substrates, with each substrate having an alignment layer arranged to induce low pre-tilt alignment in liquid crystal molecules adjacent to the alignment films.

When no electric field is applied across a pi-cell, the liquid crystal molecules adopt a splay state, also referred to as an "H-state". FIG. 5A illustrates the display 22 when no voltage is applied across the pi-cell liquid crystal layer 7, so that the molecules adopt the splay state. It can be seen that the liquid crystal molecules are perpendicular, or substantially perpendicular, to the normal axis of the display, throughout the thickness of the pi-cell liquid crystal layer 7. When no electric field is applied across the pi-cell liquid crystal layer, therefore, the pi-cell liquid crystal layer has substantially the same effect as the zero tilt uniform liquid crystal alignment shown in FIG. 2C, and a normal grey level curve is obtained over a wide range of viewing angles.

As is known, when the voltage applied across a pi-cell liquid crystal layer is increased sufficiently, the liquid crystal molecules adopt a bend state, also referred to as a "V-state". FIG. 5B shows the display 22 when a sufficiently large voltage has been applied across the pi-cell liquid crystal layer 7 to cause the liquid crystal molecules to adopt a bend state. It will be seen that it is now possible to identify first and second regions in the liquid crystal layer in which two distinct tilt states exist. The first and second liquid crystal regions are indicated by broken lines in FIG. 5B and are identified at 16 and 17, respectively. It can be seen that both regions 16, 17 in which a tilt state exists extends only over a portion of the thickness of the liquid crystal layer 7.

In the lower liquid crystal region 16, the molecules are tilted so that they provide an abnormal grey level curve for an observer 8" positioned to the right of the normal axis of the display. The liquid crystal region 16 in FIG. 5B acts in exactly the same way as the first liquid crystal region 16 in FIG. 4A or as the upper liquid crystal layer 7a of FIG. 4D. Conversely, liquid crystal molecules in the upper liquid crystal layer region 17 are tilted in the opposite direction to the molecules in the lower liquid crystal layer region 16, and so provide an abnormal grey level curve for an observer 8' positioned to the left of the normal axis of the display. The upper liquid crystal region 17 in FIG. 5B operates in the same way as the second liquid crystal region 17 of FIG. 4A or the lower liquid crystal layer 7b of FIG. 4D. Thus, when the pi-cell liquid crystal layer 7 is placed in a bend state, the display 22 will provide a normal grey level curve only for viewing directions close to the normal direction, and the display thus operates in a narrow display mode. Thus, the display 22 of FIGS. 5A and 5B operates in the same way as the display 20 of FIG. 4B or the display 21 of FIG. 4E, and can be switched to provide a narrow viewing mode in which a normal grey level curve is seen only in a narrow range of viewing angles or to provide a wide viewing mode in which a normal grey level curve is seen for a wide range of viewing angles. The difference between the display 22 of FIGS. 5A and 5B, on the one hand, and the display 20 of FIG. 4B or the display 21 of FIG. 4E on the other hand, is that the first and second liquid crystal regions 16, 17 are at different depths in the thickness of the liquid crystal layer in the display 22 of FIGS. 5A and 5B, rather than being laterally adjacent to one another.

As explained above with reference to the preferred embodiment of FIGS. 2A to 2D, the liquid crystal molecules preferably lie in a plane defined by the normal axis of the display and the transmission or absorption axis of one of the polarizers 2 and 3.

As is well known, the bend state shown in FIG. 5B must be nucleated from the zero volt splay state show in FIG. 5A, by applying a voltage greater than a threshold voltage across the pi-cell liquid crystal layer 7. In order to switch the display 22 back to the public mode, the voltage applied across the pi-cell liquid crystal layer 7 is reduced or set to zero such that the low tilt splay state of FIG. 5A is achieved, again via nucleation from the V-state. It might be possible to avoid the need for nucleation by using alignment surfaces having a suitably high pre-tilt.

Figure 6B:
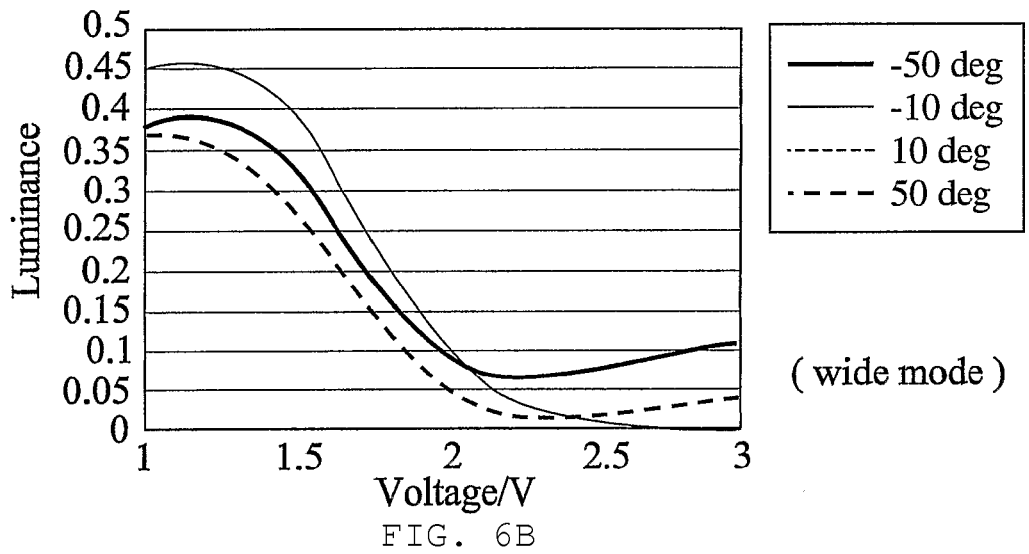
Figure 6C:
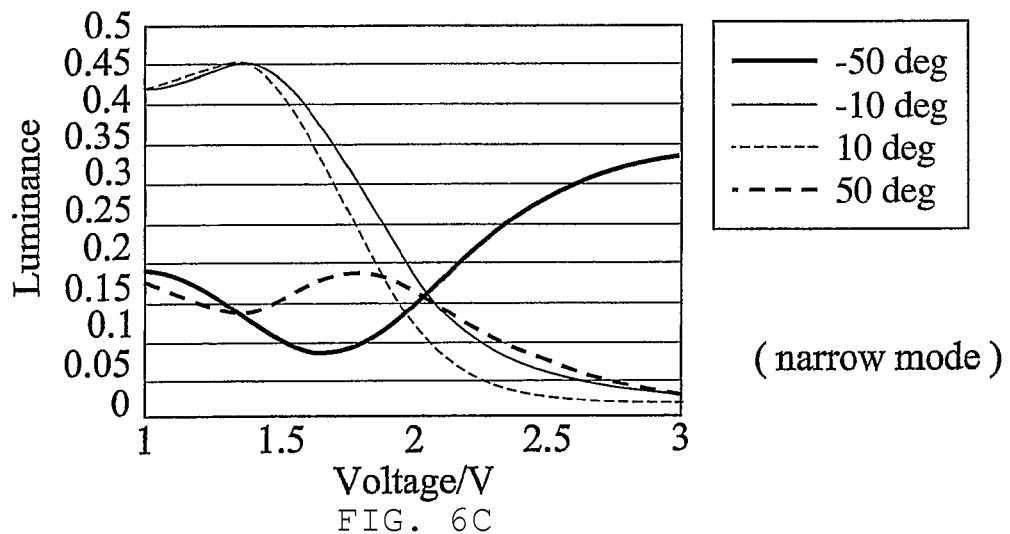

FIGS. 6A to 6C show results obtained for the display 22 of FIGS. 5A and 5B. FIG. 6A shows grey level curves obtained in the absence of the pi-cell liquid crystal layer 7. That is, the grey level curves of FIG. 6A were obtained for a conventional display including a twisted nematic liquid crystal layer disposed between entrance and exit polarizers.

FIG. 6A shows grey level curves obtained for viewing angles of −50° relative to the normal axis, −10° relative to the normal axis, 10° relative to the normal axis and 50° relative to the normal axis. In fact, the optical properties of the display are symmetric, so that the grey level curve for a viewing angle of −50° is substantially coincident with the grey level curve for a viewing angle of +50°, and the grey level curve for a viewing angle of −10° is substantially coincident with the grey level curve for a viewing angle of +10°. While there is some variation in the grey level curve with the viewing angle, it can be seen that a normal grey level curve is seen at viewing angles of ±50° as well as at viewing angles of ±10°.

FIG. 6B shows grey level curves for the display 22 of FIG. 5A, with the pi-cell liquid crystal layer 7 disposed between the TN liquid crystal display layer 1 and the exit polarizer 7. The grey level curves of FIG. 6B were obtained with the pi-cell liquid crystal layer switched to the low tilt splay state shown in FIG. 5A, so that the display 22 is in its wide viewing mode. It can be seen that the grey level curves of FIG. 6B are generally similar to the grey level curves of FIG. 6A, showing that the pi-cell liquid crystal layer, when in its low tilt splay state, has relatively little effect on the grey level curves of the display. The grey level curve for ±10° is virtually unaffected, and the grey level curve for a viewing angle of −10° has remained coincident with the grey level curve for a viewing angle of +10°. They grey level curves for viewing angles of ±50° have changed slightly from FIG. 6A to FIG. 6B, and are no longer coincident with one another. However, an essentially normal grey level curve is still obtained for viewing angles of ±50°. An image displayed on the image display layer 1 would thus have a viewing angle range of from at least −50° to at least 50°, giving a wide viewing mode.

FIG. 6C shows grey level curves for the display 22 when the pi-cell liquid crystal layer 7 is switched to the bend state shown in FIG. 5B. It can be seen, that the grey level curves for viewing angles of ±10° and −10° are relatively unchanged compared with FIG. 6B. Although the grey level curve for a viewing angle of −10° is no longer coincident with the grey level curve for a viewing angle of +10°, it is clear that an essentially normal grey level curve exists for viewing angles of ±10°.

It can, however, be seen that they grey level curves for viewing angles of ±50° have been significantly changed by switching the pi-cell liquid crystal layer 7 to its bend state. The grey level curves for viewing angles of ±50° do not exhibit a luminance that decreases monotonically as the image across the display layer is increased; indeed, the grey level curve for a viewing angle of 50° provides maximum luminance for high applied voltages, and has a minimum in luminance for an applied voltage of around 1.7V. In the case of a simple black/white image being displayed by applying a voltage of either 1V (to obtain a white display) or a voltage of about 2.5V (to obtain a black state), it is clear that a viewer at a viewing angle of ±50° will experience an image that has a very low contrast, and an observer at a viewing angle of −50° will see an image displayed with reversed contrast. In contrast, an observer viewing the display at a viewing angle of ±10° would see a near-normal image. Thus, the image quality at high viewing angles has been made much lower, and a good image is displayed only for low viewing angles thereby providing a narrow viewing mode. An image is displayed with a high level of privacy in the narrow viewing mode.

In the preferred embodiment of FIGS. 5A and 5B, the pi-cell liquid crystal layer 7 may have a uniform liquid crystal alignment over its entire area. This would mean that the grey level curve would be affected in the same way, when the pi-cell liquid crystal layer is switched to its narrow state, over the entire area of the display. This should be suitable for displaying a non-text image with a high level of privacy, but it might not be adequate for displaying text since text that has simply been inverted in contrast can be read easily. If the preferred embodiment of FIGS. 5A and 5B is used with a single, uniform pi-cell liquid crystal layer, it may therefore be desirable to make the grey level curve for viewing angles outside the intended viewing angle range in the narrow view mode as flat as possible in the narrow view mode, so that both non-text images and text are displayed with virtually no contrast at high viewing angles. A substantially flat grey level curve may be obtained by suitable choice of the parameters of the liquid crystal material such as, for example, thickness, optical anisotropy and tilt profile. Other preferred embodiments of the present invention may also be arranged to have a substantially flat grey level curve outside the intended viewing angle range in the narrow view mode.

In a modification of the present preferred embodiment, the electrodes used to drive the pi-cell liquid crystal layer 7 may be patterned, such that the grey level curve for different areas of the display 22 are affected in different ways. For example, the electrodes for applying a voltage across the pi-cell liquid crystal layer could be patterned so as to apply a voltage across some regions of the pi-cell liquid crystal layer but not across other regions of the pi-cell liquid crystal layer. When voltage is applied across the electrodes to switch the pi-cell liquid crystal layer to its narrow state, this would result in the bend state forming in some regions of the pi-cell liquid crystal layer (corresponding to the regions where a voltage was applied), while the low tilt splay state would remain in other regions of the pi-cell liquid crystal layer (corresponding to regions where no voltage was applied by the electrodes). The regions of the pi-cell liquid crystal layer 7 that switched to the bend state would give an abnormal grey level curve, with contrast inversion, whereas the regions of the pi-cell liquid crystal layer in which the low tilt splay state remains would give a substantially unaffected grey level curve. The resultant variation in the grey level curve over the area of the display would cause confusion, and would be very effective at providing privacy for both images and text.

The patterning of the pi-cell liquid crystal layer could be made even more complex by use of more complicated electrode patterning, or by use of driving techniques such as multiplexing such that the voltage applied across the pi-cell liquid crystal layer varies from one area of the pi-cell liquid crystal layer to another. In this case, the amount of distortion caused to the grey level curve would vary even more from one region of the pi-cell liquid crystal layer to another, and a more complex pattern of confusion would result. This may be particularly effective for making moving images private, since the human eye is very cable of filtering out simple patterns.

The driving technique may further be adapted to provide time-varying patterning of the pi-cell liquid crystal layer. This again leads to time-varying grey level curves in the viewing regions where abnormal grey level curves are seen, and so makes it harder for an observer in a viewing region where abnormal grey level curves are seen to make out a displayed image.

In the preferred embodiment of FIGS. 5A and 5B, the pi-cell liquid crystal layer 7 has zero twist. As a result, in order to switch the pi-cell liquid crystal layer from the low tilt splay state to the bend state, it is necessary to nucleate the bend state, and this process is slow and requires nucleation seeds to initiate the transition. In order to avoid the need to nucleate the bend state, it is possible to add a suitable chiral dopant to the liquid crystal material of the pi-cell liquid crystal layer, so that the stable liquid crystal state when no voltage is applied to the pi-cell liquid crystal layer is a 180° twist state. When a voltage is applied across the pi-cell liquid crystal layer the transition to a high voltage bend state can be achieved without nucleation, so that the transition is much faster than for a zero twist pi-cell liquid crystal layer. The high voltage bend state obtained in a 180° twist pi-cell liquid crystal layer will be very similar to the bend state shown in FIG. 5B, and will again provide a narrow viewing mode for the display.

Where a 180° twist pi-cell liquid crystal layer is used, it is preferable that the pi-cell liquid crystal layer has the correct optical thickness such that, when no voltage is applied across the pi-cell liquid crystal layer and the liquid crystal molecules adopt the 180° twist state, the effect of the pi-cell liquid crystal layer is to rotate the plane of polarization of incident light by 180° (or by an integer multiple of 180°). The pi-cell liquid crystal layer will then have no effect on the grey level curve when switched to the 180° twist state, and a normal grey level curve will be seen over a wide range of viewing angles.

As an example, to obtain an approximately 4 µm thick liquid crystal layer with a twist of 180° across the liquid crystal layer would require the use of a chiral dopant with a pitch of about 8 µm. The twist can be either left-handed (s-type) or right-handed (r-type). Chiral dopants R811 (also known as ZLI3786, obtainable from Merck) and S811 (also known as ZLI811, obtainable from Merck) are suitable dopants, since each has a low helical twisting power of 11, but in opposite senses. The helical twisting power (HTP) may be defined as HTP=100/(pitch×weight concentration). Thus, to obtain a pitch of about 8 µm using a chiral dopant of HTP=11 requires a concentration of about 1.14% chiral dopant by weight.

Figure 7A:
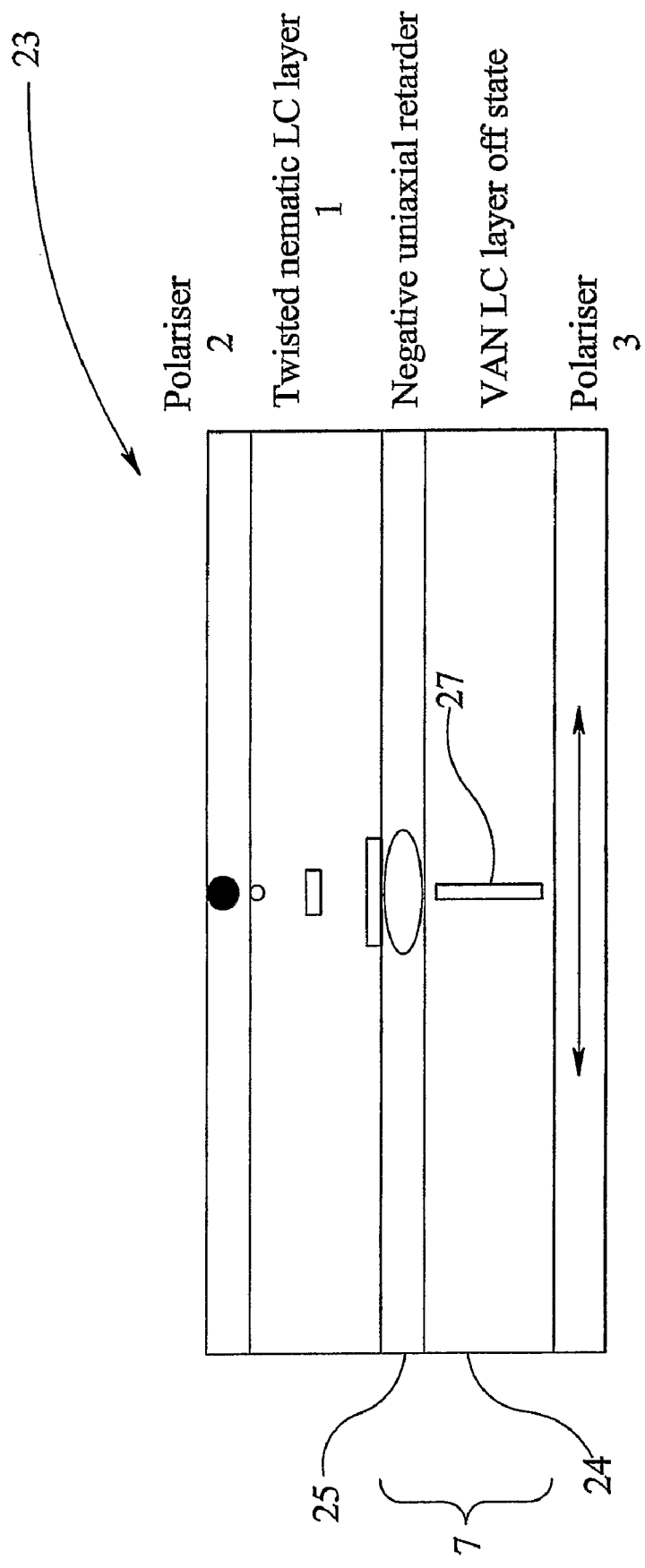
FIG. 7A is a schematic sectional view of a display according to a further preferred embodiment of the present invention in its public mode.
Figure 7B:
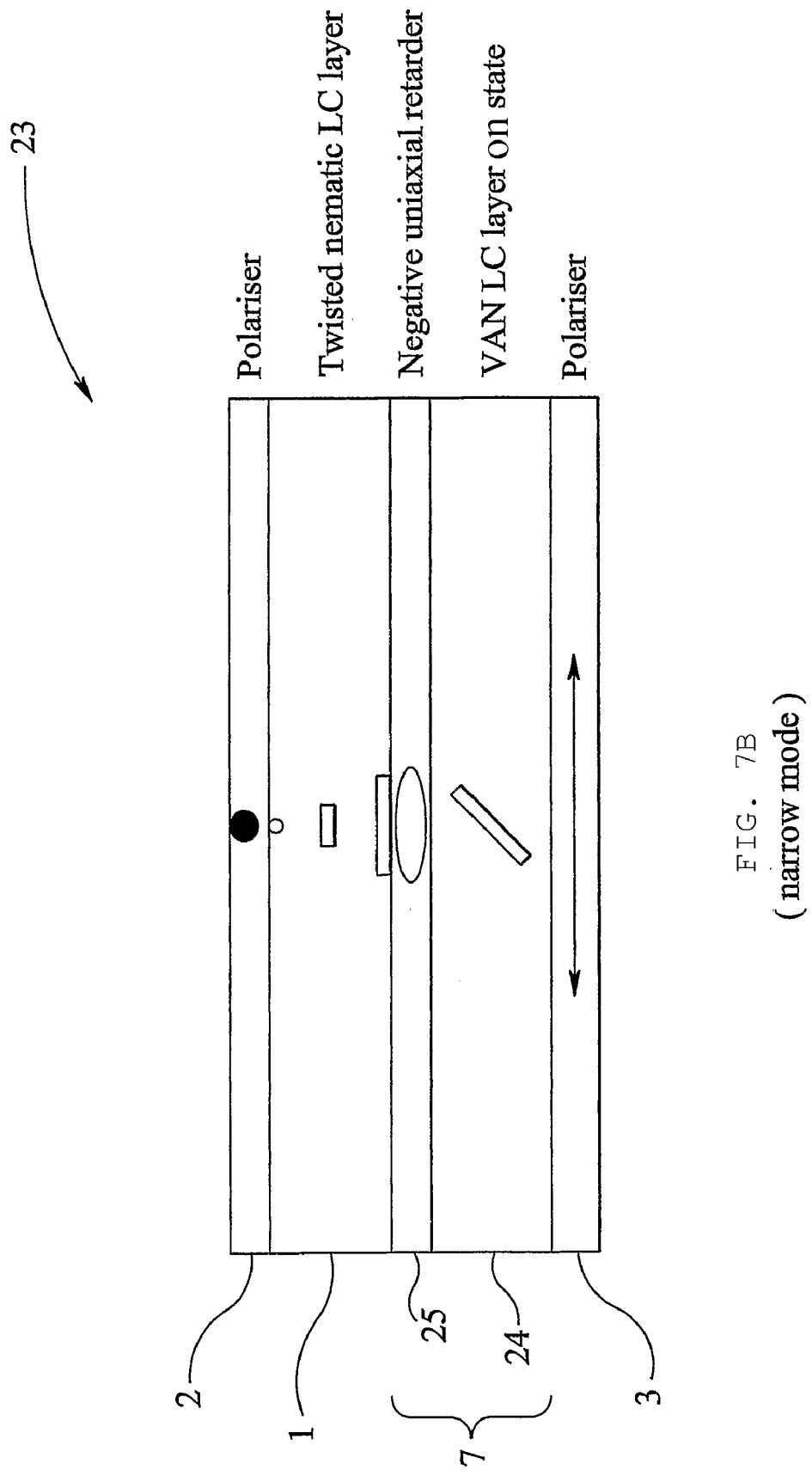
FIG. 7B shows the display of FIG. 7A in its private mode.

Some liquid crystal modes for the additional liquid crystal layer will provide an abnormal grey scale on both sides of the normal axis in the narrow viewing mode without the need for patterning the liquid crystal layer or providing two additional liquid crystal layers. FIGS. 7A and 7B show a display according to a further preferred embodiment of the present invention where a single additional liquid crystal layer will provide an abnormal grey scale on both sides of the normal axis in the narrow viewing mode. The display 23 includes an image display layer 1 disposed between an entrance polarizer 2 and an exit polarizer 3. The image display layer 1 may be any suitable image display layer 1 and is shown in FIGS. 7A and 7B as a twisted nematic liquid crystal layer. The display 23 is a transmissive display and, in use, is illuminated by a suitable backlight (not shown).

The display 23 also preferably includes additional components 7 arranged to allow the display to be switched between a wide viewing mode and a narrow viewing mode. The additional components 7 may preferably include a liquid crystal layer 24 and a fixed retarder 25. FIGS. 7A and 7B show the fixed retarder positioned between the additional liquid crystal layer 24 and the entrance polarizer 2, but the present preferred embodiment could alternatively be implemented by providing the fixed retarder 25 between the additional liquid crystal layer 24 and the exit polarizer 3. Again, the additional liquid crystal layer 24 may in practice be incorporated in a liquid crystal panel, but other components of the panel, such as substrates, alignment surfaces for aligning the liquid crystal molecules 27 and electrode layers for applying an electric field, may be conventional and are omitted from FIG. 7A for clarity.

When light propagates through the display 23 at an angle to the normal axis, the fixed retarder 25 and the additional liquid crystal layer 24 will both have a non-zero effective refractive index anisotropy $\Delta n$. According to this preferred embodiment of the present invention, the additional liquid crystal layer 24 has, when the liquid crystal molecules are switched to the wide state, a refractive index anisotropy of opposite sign to the refractive index anisotropy of the fixed retarder. If the fixed retarder 25 and the additional liquid crystal layer are selected appropriately, it can be arranged that the retardation caused by the fixed retarder 25 is equal in magnitude, but opposite in sign, to the retardation caused by the additional liquid crystal layer 24 in its wide state, so that the retardation of the fixed retarder is cancelled by the retardation of the additional liquid crystal layer. The combination of the fixed retarder 25 and the additional liquid crystal layer thus provide no overall retardation, so that the polarization state of light propagating through the display, whether parallel to the normal axis or at an angle to the normal axis, does not change. Thus, light propagating through the display will have a normal grey level curve, so that a normal grey level curve will be seen over a wide viewing angle range thereby giving the display a wide viewing mode.

When the additional liquid crystal layer 24 is switched to its narrow state its retardation changes, the retardation of the fixed retarder 25 will not exactly compensate for the retardation of the additional liquid crystal layer and light will experience a non-zero overall retardation on passing through the fixed retarder 25 and the additional liquid crystal layer 24. The non-zero overall retardation will lead to a change in the polarization state of light propagating at an angle to the normal axis, and thereby cause a viewing angle-dependent change in the polarization state. This leads to an abnormal grey level curve for light propagating at some angles to the normal axis, and thus provides a narrow display mode. The presence of the retarder 25 means that this preferred embodiment is not limited to having a horizontal alignment in the wide view mode. As an example, in one implementation of this preferred embodiment, the additional liquid crystal layer 24 is a vertically aligned nematic liquid crystal layer. When no voltage is applied, the liquid crystal molecules 27 of the VAN liquid crystal layer 24 are aligned parallel to the normal axis of the display, as shown in FIG. 7A. The VAN liquid crystal layer has a positive refractive index anisotropy, so the fixed retarder 25 is chosen to have a negative refractive index anisotropy. In the specific implementation of FIGS. 7A and 7B, the fixed retarder 25 is a negative uni-axial retarder arranged with its optic axis perpendicular to the plane of the retarder. The optic axis of the fixed retarder 25 is therefore parallel to the normal axis of the display 23. The retarder 25 may be, for example, a discotic retarder such as a discotic liquid crystal layer.

Light that propagates through the display along the normal axis is propagating parallel to the optic axis of the fixed retarder 25 and is also parallel to the optic axis of the VAN liquid crystal layer 24 when the liquid crystal molecules 27 of the VAN liquid crystal layer 24 are aligned parallel to the normal axis of the display as shown in FIG. 7A. Accordingly, the effective refractive index anisotropy is zero, and the light experiences no change in its polarization state as a result of its passage through the fixed retarder 25 and the VAN liquid crystal layer 24. The luminance of the display is then determined by the image display layer 1 and the entrance and exit polarizers 2 and 3, and a normal grey level curve is obtained over a wide range of viewing angles such that the display 23 operates in a wide viewing mode.

When a suitable voltage is applied across the VAN liquid crystal layer 24, the liquid crystal molecules adopt a tilted state in which they are no longer parallel to the normal axis of the display, as shown in FIG. 7B. As a result, when light propagates through the display at an angle to the normal axis the retardation of the fixed retarder 25 will not exactly compensate the retardation of the VAN liquid crystal layer, and light will experience a non-zero overall retardation on passing through the fixed retarder 25 and the VAN liquid crystal layer 24. The non-zero overall retardation will lead to a change in the polarization state of light that has passed through the image display layer and that is propagating at an angle to the normal axis. This change in polarization state is converted into a change in luminance by the exit polarizer 3, and thereby causes an abnormal grey level curve.

In this preferred embodiment, it is preferable that the tilted state of the VAN liquid crystal layer is such that the azimuthal direction of the molecules in their tilted state is parallel or perpendicular to the transmission axis of the exit polarizer 3. With this orientation, light propagating along the normal axis of the display 23 will experience no change to its polarization state as a result of its passage through the fixed retarder 25 and the VAN liquid crystal layer 24. Light propagating through the display 23 along the normal axis of the display will therefore have a normal grey level curve. The display 23 will then provide a narrow viewing angle mode in which a normal grey level curve can be seen by an observer looking along the normal axis or along directions close to the normal axis, but in which an abnormal grey level curve is experienced by an observer looking at viewing angles that are well away from the normal axis.

Designing the two layers so as to produce no overall retardation essentially requires choosing suitable thicknesses for the VAN layer and the retarder. For example, an approximately 6 μm thick VAN layer formed of the liquid crystal MLC-6883 has $\Delta n=0.1086$, giving a value for the layer of $\Delta n \cdot d=651$ nm. A discotic film having $\Delta n=-0.093$ should have a thickness of about 7 μm to compensate for the retardation of the VAN layer at high viewing angles.

The preferred embodiment of FIGS. 7A and 7B is particularly advantageous because it does not require a horizontal liquid crystal alignment in the wide viewing mode. Apart from providing greater design choice, this preferred embodiment has the advantage that it can in practice be difficult to obtain an exact horizontal liquid crystal alignment. In many cases, a "horizontal" alignment will in practice have a residual tilt of 1°-2°, and this would degrade the wide viewing mode. The use of a retarder 25 can compensate for such residual tilt, and allow a good wide viewing mode to be obtained even in the absence of an exact horizontal alignment.

Figure 8A:
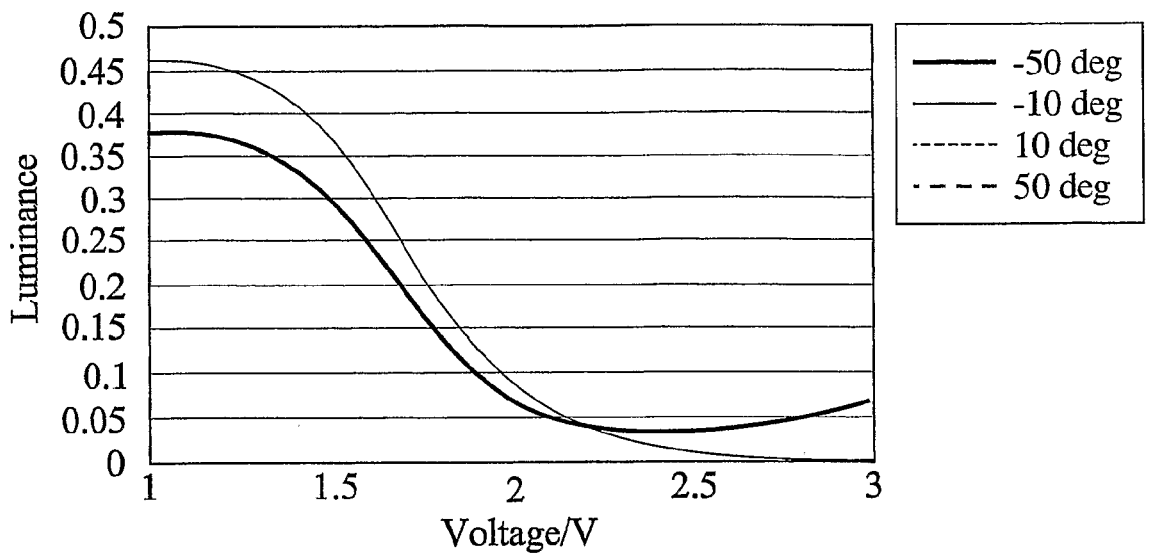
FIGS. 8A to 8C illustrate the operation of the display of FIG. 7A.
Figure 8B:
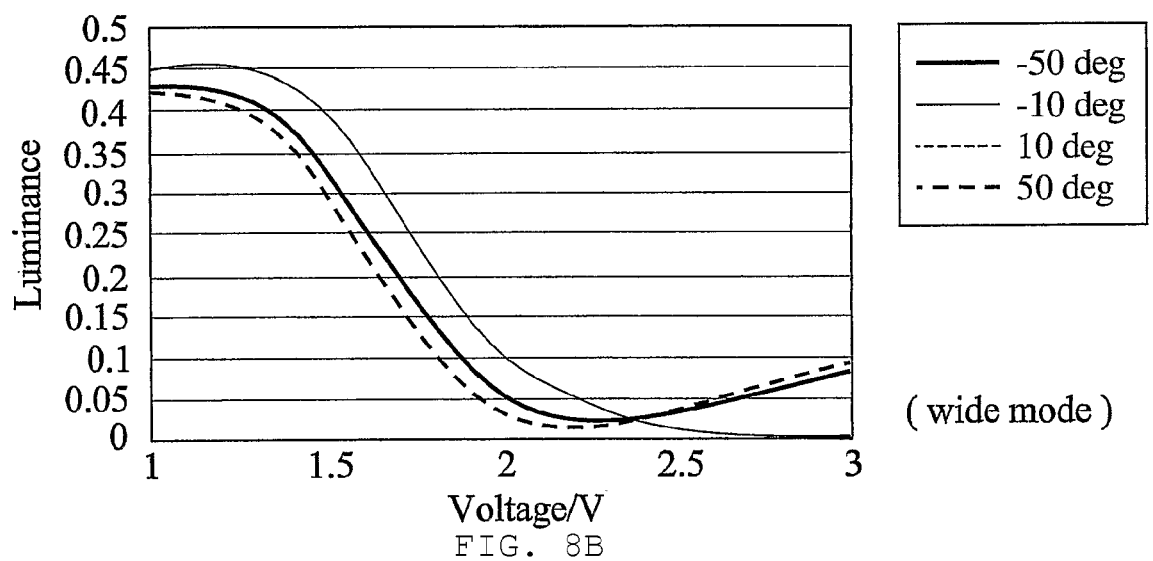
Figure 8C:
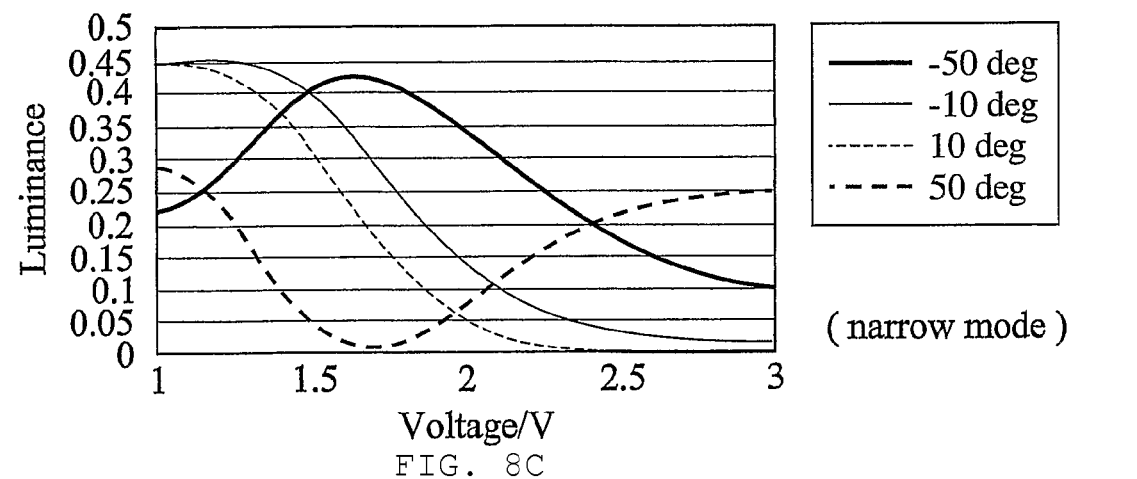

FIGS. 8A to 8C show results for the display 23 of FIGS. 7A and 7B. FIG. 8A shows grey level curves for the TN liquid crystal layer 1, in the absence of the VAN liquid crystal layer 24 and the fixed retarder 25. The results of FIG. 8A correspond to those of FIG. 6A, and will accordingly not be described further.

FIG. 8B shows the grey level curves for the display 23 of FIG. 7A, with the VAN liquid crystal layer switched so that the liquid crystal molecules are oriented generally parallel to the normal axis of the display. It can be seen that the grey level curves are substantially unaltered compared to those of FIG. 8A. At a viewing angle of ±50° relative to the normal axis, an essentially normal grey level curve is obtained, although the grey level curves do show a minimum in luminance for an applied voltage across the TN liquid crystal layer of around 2.2V, with the luminance increasing slightly for higher applied voltages. It can also be seen that the grey level curve for a viewing angle of −50° is no longer exactly coincident with the grey level curve for a viewing angle of =50°. However the grey level curve is essentially normal at all viewing angles of up to at least ±50°, so that a wide viewing angle mode is obtained.

FIG. 8C shows grey level curves obtained for the display of FIG. 7B, when a voltage is applied across the VAN liquid crystal layer to put the liquid crystal molecules of the VAN liquid crystal layer into their tilted orientation. It can be seen that the grey level curves for viewing angles of +10° are not affected significantly. Although the grey level curve for a viewing angle of −10° is no longer exactly coincident with the grey level curve for a viewing angle of +10°, both grey level curves show a monotonic decrease of luminance as the voltage applied across the TN liquid crystal layer 1 increases. A normal grey level curve is obtained for viewing angles of ±10°.

It can, however, be seen that the grey level curves for viewing angles of ±50° have been significantly changed. The grey level curve for a viewing angle of −50° has initially a relatively low luminance, and increases to a maximum as the voltage applied across the TN liquid crystal layer is increased to around 1.7V. The luminance thereafter decreases for further increases in the voltage applied across the TN liquid crystal layer. Conversely, the grey level curve for a viewing angle of +50° initially decreases as the applied voltage across the TN liquid crystal layer is increased, becoming almost zero for an applied voltage of around 1.7V. The luminance thereafter increases gradually as the applied voltage across the TN liquid crystal layer is further increased. An observer viewing the display at a viewing angle of ±50° will therefore see a disrupted image, owing to the abnormal grey level curves at these angles. The display thus operates in a private mode, with a narrow viewing angle range.

In the preferred embodiment of FIGS. 7A and 7B, the additional liquid crystal layer 24 may be driven using patterned electrode layers so that, in the narrow viewing mode of the display, some regions of the additional liquid crystal layer are in their wide state and other regions are in their narrow state. As described above with reference to FIGS. 5A and 5B, this further improves privacy in the narrow viewing mode.

In the preferred embodiment of FIGS. 7A and 7B, the additional liquid crystal layer 24 and the fixed retarder 25 are placed between the image display layer and the exit polarizer. They could alternatively be placed between the entrance polarizer 2 and the image display layer 1. If so, the fixed retarder 25 may be placed between the entrance polarizer 2 and the additional liquid crystal layer 24, or between the additional liquid crystal layer 24 and the image display layer 1.

The preferred embodiment of FIGS. 5A and 5B, and the preferred embodiment of FIGS. 7A and 7B are shown with an image display layer formed by a 90° twisted nematic liquid crystal layer. As a result, the transmission axis of the exit polarizer 3 is arranged at 90° relative to the transmission axis of the entrance polarizer 2. The transmission axis of the entrance polarizer 2 is depicted as running into the plane of the paper in FIGS. 5A, 5B, 7A and 7B, and the transmission axis of the exit polarizer 3 is depicted as parallel to the plane of the paper in the figures. These preferred embodiments are not, however, limited to this particular form for the image display layer, and a twisted nematic liquid crystal layer having a twist other than 90° could be used in these preferred embodiments provided that the transmission axes of the entrance and exit polarizers were adjusted accordingly. Indeed, these preferred embodiments are not restricted to use of a twisted nematic liquid crystal layer for the image display layer, and any suitable transmissive image display layer could be used.

Figure 9A:
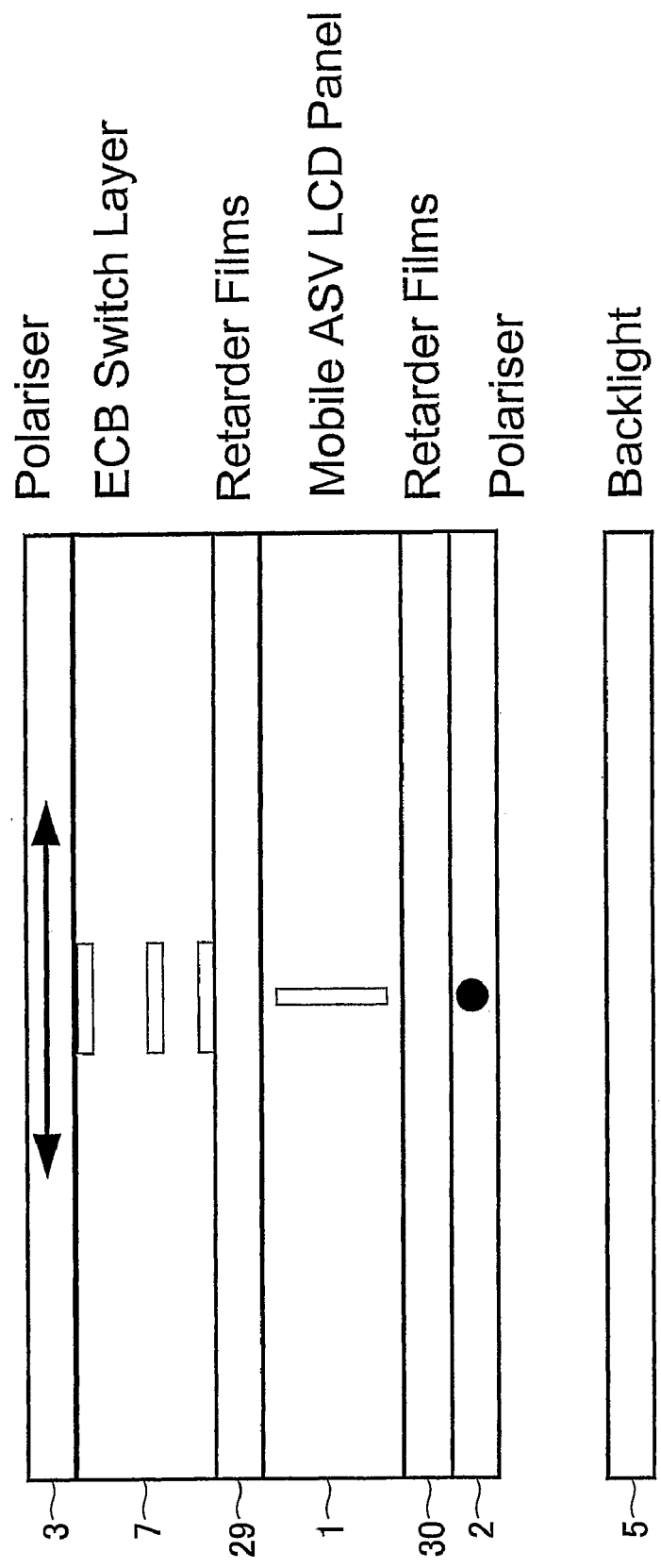
FIGS. 9A and 9B are schematic sectional views of a display according to a further preferred embodiment of the present invention in its wide viewing mode and narrow viewing mode, respectively.
Figure 9B:
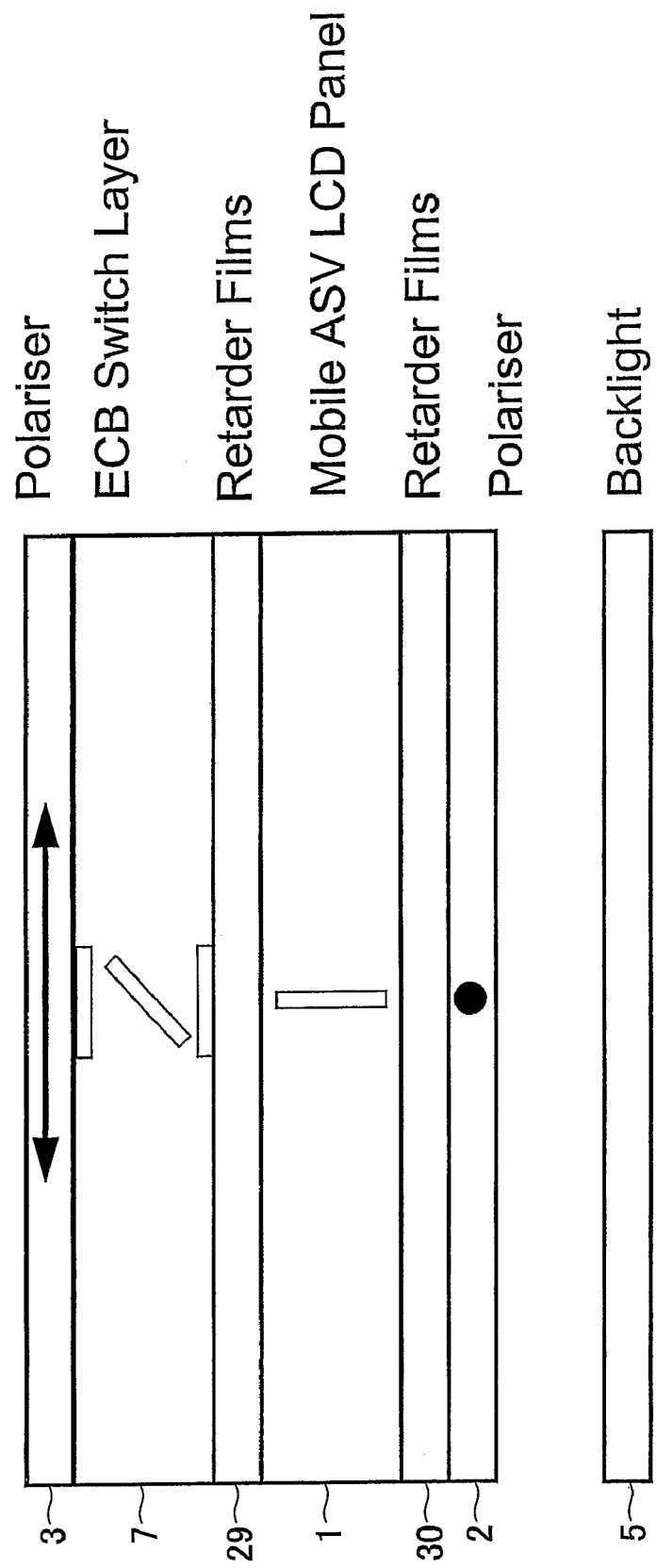

FIGS. 9A and 9B are schematic section views through a display 28 according to a further preferred embodiment of the invention. FIG. 9A shows the display in its wide viewing mode and FIG. 9B shows the display in its narrow viewing mode. As in previous preferred embodiments, the display 28 preferably includes an image display 1 disposed between an entrance polarizer 2 and an exit polarizer 3. The display also includes an additional component 7 to provide angular light modulation and thus allow the display to operate in a wide viewing mode or a narrow viewing mode.

In the preferred embodiment of FIGS. 9A and 9B, the additional component 7 is an electrically controlled bi-refringence (ECB) mode liquid crystal layer. The ECB liquid crystal layer may in practice be incorporated in a liquid crystal panel, but other components of the panel, such as substrates, alignment surfaces for aligning the liquid crystal molecules 27 and electrode layers for applying an electric field, may be conventional and are omitted from FIGS. 9A and 9B for clarity.

When no voltage is applied, the liquid crystal molecules of the ECB liquid crystal layer 7 are aligned parallel to the plane of the substrates of the display (not shown in FIG. 9A or 9B), as shown in FIG. 9A, with an azimuthal orientation parallel to the transmission axis of the exit polarizer 3. The ECB liquid crystal molecules may alternatively be aligned parallel to the plane of the substrate but with an azimuthal orientation perpendicular to the transmission axis of the exit polarizer 3. Light that propagates through the display along the normal axis (perpendicular to the plane of the substrate) is propagating perpendicular to the optic axis of the ECB liquid crystal layer 7 and consequently the effective refractive index anisotropy is zero and the light experiences no change in its polarization state as a result. Light that propagates off-axis (i.e., not in a direction perpendicular to the substrates of the display) experiences substantially zero effective retardation upon passing through the ECB liquid crystal layer 7 and the light experiences no change in its polarization state as a result. Consequently, the luminance of the display is then determined by the image display layer (the Mobile ASV LCD panel in FIG. 9A) and the entrance and exit polarizers 2 and 3, and a normal grey level curve is obtained over a wide range of viewing angles such that the display operates in a wide viewing mode.

When a suitable voltage is applied across the ECB liquid crystal layer, the ECB liquid crystal molecules adopt a tilted state in which they are no longer parallel to the substrate of the display, as shown in FIG. 9B. As a result, when light propagates through the display off-axis (i.e., not in a direction perpendicular to the substrate) the light will experience a non-zero overall retardation upon passing through the ECB liquid crystal layer 7. The non-zero overall retardation will lead to a change in the polarization state of light that has passed through the image display layer 1 and that is propagating at an angle to the normal axis. This change in polarization state is converted into a change in luminance by the exit polarizer 3, and thereby causes an abnormal off-axis grey level curve. The tilted molecular structure of the ECB liquid crystal layer is symmetrical about the plane of the tilt and consequently equal amounts of retardation are experienced by light that propagates through the ECB liquid crystal layer symmetrically with respect to the plane of molecular tilt. As a result, the privacy function (grey-level curve) is symmetrical with respect to the plane of ECB molecular alignment, as shown in FIG. 10B.

In this preferred embodiment, it is preferable that the tilted state of the ECB liquid crystal layer is such that the azimuthal direction of the ECB liquid crystal molecules in their tilted state is parallel or perpendicular to the transmission axis of the exit polarizer 3. With this orientation, light propagating along the normal axis of the display will experience no change to its polarization state as a result of its passage through the ECB liquid crystal layer 7. Light propagating through the display along the normal axis of the display will therefore have a normal grey level curve. The display will then provide a narrow viewing angle mode in which a normal grey level curve can be seen by an observer looking along the normal axis or along directions close to the normal axis, but in which an abnormal grey level curve is experienced by an observer looking at viewing angles that are well away from the normal axis.

As a practical example of the preferred embodiment described above, an approximately 5 micron thick ECB liquid crystal panel was made and filled with liquid crystal ZLI-4619-100 which has bi-refringence $\Delta n=0.0823$. The total retardation of the layer was $\Delta n \cdot d=411$ nm. This layer was added to a 'Mobile ASV' LCD panel 1 which is a common display panel used in mobile phones. The Mobile ASV LCD panel is based on a VAN liquid crystal mode, with added optical retarder films 29, 30 so that the polarization of the light transmitted through the panel 1 is circular rather than linear. The current invention preferably uses light that is linearly polarized when it is transmitted by the additional liquid crystal layer 7, and the additional ECB liquid crystal panel is preferably located between the retarder films and one polarizer, as shown in FIGS. 9A and 9B. At this location the light is linearly polarized.

Although FIGS. 9A and 9B show the image display layer 1 as a Mobile ASV LCD panel, the preferred embodiments are not limited to this particular image display layer. An ECB liquid crystal layer may be used to provide angular light modulation for other image display layers.

Figure 10A:
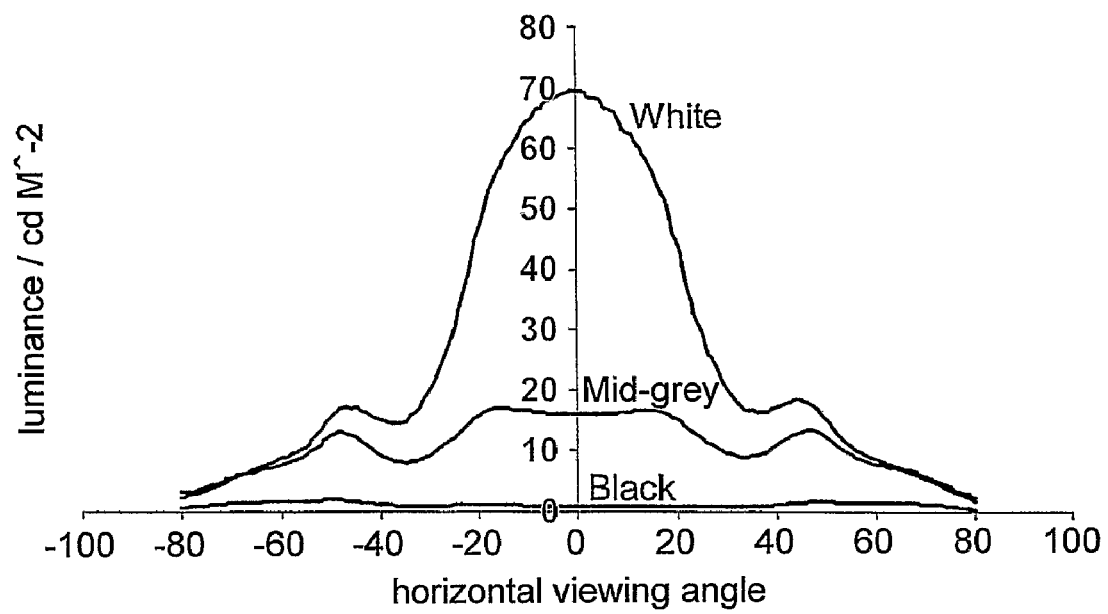
FIG. 10A shows intensity as a function of angle at three grey level values for the display of FIG. 9A.
Figure 10B:
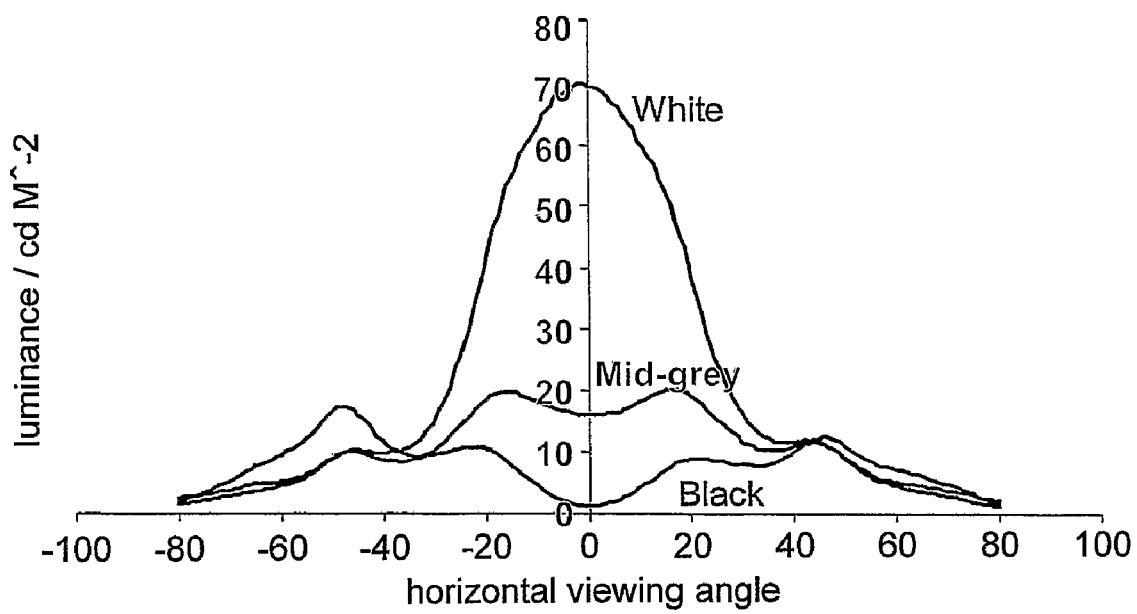
FIG. 10B shows intensity as a function of angle at three grey level values for the display of FIG. 9B.

FIGS. 10A and 10B show the intensity as a function of angle for a display having a Mobile ASV LCD panel, at three grey level values. An ECB liquid crystal panel 7 has been sandwiched between the exit polarizer of the display and the retarders of the Mobile ASV panel as described above. In FIG. 10A, zero volts is applied to the ECB liquid crystal panel 7 such that the molecules of the ECB liquid crystal layer are aligned in the plane of the panel. In FIG. 10B, a voltage is applied across the ECB liquid crystal panel 7 such that a tilted state is achieved as shown in FIG. 9B. It can be seen in FIG. 10A that at zero voltage applied across the ECB liquid crystal layer 7 there is a uniform progression of brightness from dark to light grey level, at all angles of incidence. Thus, a wide viewing mode is obtained. However, when a voltage is applied to the ECB liquid crystal panel the brightness at high angles of incidence is no longer monotonically increasing with grey level as shown in FIG. 10B and therefore, the image quality at these high angles of incidence will be disrupted thereby giving a narrow viewing mode.

The ECB liquid crystal panel 7 can be positioned on the side of the image display layer 1, facing either the backlight 5 or the viewer. However, where a Mobile ASV LCD panel is used as the image display layer, it is advantageous to position ECB liquid crystal layer 7 on the side of the image display layer 1 facing the viewer to avoid stray reflections from the backlight. In addition, it is advantageous for the polarizers 2 and 3, the retarders 29 and 30, the image display panel 1 and the ECB liquid crystal panel 7 all to be optically bonded with refractive index matching material.

Figure 11:
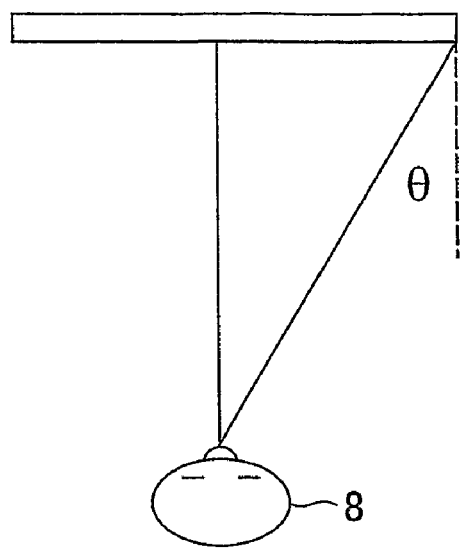
FIG. 11 illustrates a possible problem in a narrow viewing mode.

As described above, the additional liquid crystal layer 7 of a display according to a preferred embodiment of the present invention may be provided with patterned electrodes so that different angles of tilt of the liquid crystal molecules may be obtained in different regions of the additional liquid crystal layer 7, to enhance privacy of a displayed image in the narrow viewing mode. One possible disadvantage of using patterned electrodes to drive the additional liquid crystal layer 7 is that in, the narrow viewing mode, the pattern or image intended to be seen by a viewer viewing the display in an off-axis direction may also be seen by a viewer viewing the display along its normal axis, particularly at the corners or edges of the display. This is the effect is illustrated in FIG. 11 where it can be seen that, although the viewer 8 is viewing the display along its normal axis, light reaching the viewer's eyes from the edge of the display is emitted at a significant angle to the normal direction of the display panel.

Figure 12:
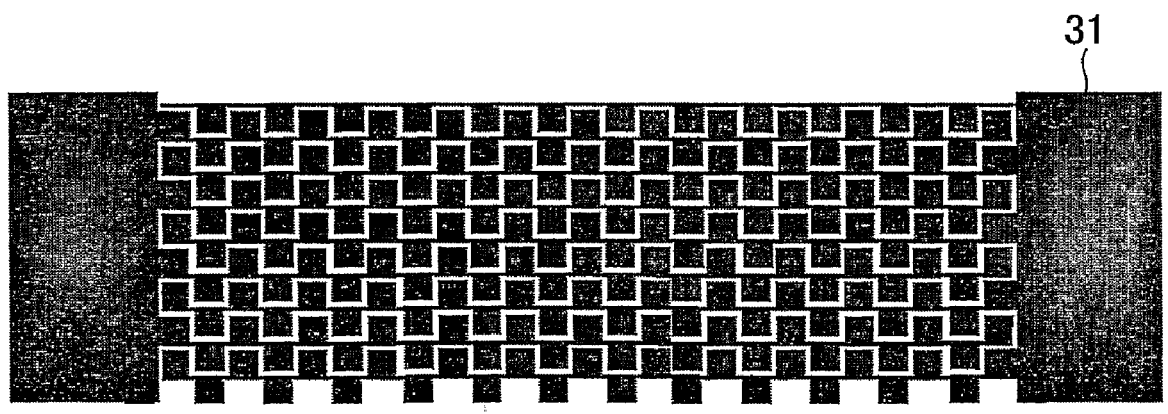
FIG. 12 is a schematic plan view of an electrode for overcoming the problem illustrated in FIG. 11.

This problem can be avoided if a small voltage is applied to regions of the additional liquid crystal layer 7 which are not normally switched. Then the modification of the grey level curves for these low voltage regions matches the high voltage regions at small angles of incidence. However, the modification of the grey level curves for the low voltage region remains minor as the viewing angle increases. This gives less visibility of the privacy pattern at small angles while maintaining the privacy effect at large angles. An electrode layout 31 suitable for providing a small and large voltage to different regions of the ECB panel is shown in FIG. 12. This is described in more detail in GB 2 413 394 and EP 1 589 366, which are hereby incorporated by reference.

The electrode layout 31 of FIG. 12 also has the advantage that the electrode material may cover substantially the entire visible area of the display. The gaps between electrode areas may be made as small as about 10 μm. This prevents the patterning of the electrodes from being visible in the wide viewing mode, as a result of optical loss from the electrode material.

As noted above, although various preferred embodiments of the present invention have been described with reference to transmissive displays the present invention is not limited to a transmissive display. The present invention may alternatively be applied to a reflective display or to a transflective display.

In any of the preferred embodiments described herein, if the image display layer of the display can be driven in such a way as to vary its viewing angle characteristics, such a driving technique may be combined with any of the preferred embodiments of the present invention described above. For example, if the image display layer of the display naturally exhibits contrast reversal in a particular drive regime at high viewing angles (for example, if the image display layer includes a liquid crystal material that exhibits contrast reversal in a particular voltage range at high viewing angles), the image display layer may, in the narrow view mode, be driven in the regime in which it exhibits contrast reversal at high viewing angles, for example, using a technique similar to the "Rocket" software.

Any of the preferred embodiments described herein may be arranged to provide an indication to a user of when the display is in the private or narrow viewing angle mode. For example, this may be provided within software which causes an image or icon to be displayed to show that the display is in the private mode. Such an icon may be overlaid, for example, on a displayed image at the bottom of the screen of the display, and may include the word "private". Alternatively, this function may be provided in the image display or in the additional components so that, when the display is switched to the private mode, a portion of the image display of the additional components is activated in order to display an appropriate icon.

The displays described herein may be combined with or provided in association with a device or arrangement which automatically switches the display to the private mode when the content of the image to be displayed is of the appropriate type. For example, if the display is used for viewing internet pages, any of the software flags associated with internet pages may be used to trigger the display so that it operates in the private mode. An example of such an application is when a browser is working in a secure encrypted mode, for example, when personal bank details are being viewed or when secure transactions are being conducted.

It is also possible to arrange for the display to switch to the private mode when the display is part of or is associated with a display for data entry and the type of data being entered or about to be entered is such that the private display mode is required. For example, the entering of a personal identification number ("PIN") may automatically cause the display to switch to the private mode. Such an arrangement may, for example, be used with "chip and pin" technology in retail trading outlets.

In the preferred embodiments described above the liquid crystal layer 7, 15 has the same sign positive or negative of retardation in the alignment that produces the narrow viewing mode as it does in alignment that produces the wide viewing mode. The sign of the retardation of a material is defined to be positive if the refractive index measured parallel to the optic axis is larger than the refractive index measured perpendicular to the optic axis.

In the preferred embodiments described above, the state of the additional liquid crystal layer 7 in the wide viewing mode of the display preferably is a horizontal or vertical liquid crystal state. In principle, however, the present invention is not limited to this.

Whether a display according to various preferred embodiments of the present invention includes a patterned additional liquid crystal layer 7, for example, as shown in any of FIGS. 4A to 4C, or, alternatively, includes two additional liquid crystal layers as shown in FIGS. 4D and 4E), in order to obtain an abnormal grey scale on both sides of the normal axis in the narrow viewing mode depends on the liquid crystal mode of the additional liquid layer(s) 7. Some liquid crystal modes for the additional liquid crystal layer will provide an abnormal grey scale on both sides of the normal axis in the narrow viewing mode without the need for patterning the liquid crystal layer or providing two additional liquid crystal layers.

In many of the preferred embodiments described above the narrow viewing angle range has been such that its bisector is parallel, or substantially parallel, to the normal axis of the display. In some applications, however, it may be desirable for the narrow viewing angle range to be such that its bisector is not parallel to the normal axis of the display. This feature may be desirable when the display is used in an automotive application, for example, in the dashboard of a vehicle. Such an arrangement could be used so that, in the narrow viewing angle mode, the passenger or driver is unable to view the displayed image. This may be achieved, for example, by using a display as shown in FIGS. 2A to 2D, in which the bisector of the narrow viewing angle range shown in FIG. 2A is not parallel to the normal axis of the display.

The problem of an image on a display being visible to people other than the intended viewer can be more serious in conditions of low ambient light, since the displayed image appears brighter in low lighting conditions. It is therefore possible for the displays described above to include an ambient light sensor, and to arrange for the display to switch to the private mode when the output from the ambient light sensor indicates that the level of ambient light has fallen below a pre-set threshold.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display comprising:
a display device having a first polarizer, one of a second polarizer and a reflector, and a display layer disposed between the first polarizer and said one of the second polarizer and the reflector; and
a liquid crystal layer disposed between the display layer and one of the first polarizer and said one of the second polarizer and the reflector; wherein
liquid crystal molecules of at least one region of the liquid crystal layer are switchable between a first state in which the display has a first display mode with a first viewing angle range and a second state in which the display has a second display mode having a second viewing angle range smaller than the first viewing angle range, the liquid crystal layer having the same sign of retardation in the first state as in the second state; and
in the second state, liquid crystal molecules of the at least one region are tilted with respect to the normal axis of the display over at least a portion of the thickness of the liquid crystal layer, and lie substantially parallel to a plane defined by the normal axis of the display and the transmission axis or absorption axis of the first polarizer or one of the first and second polarizers.

2. A display as claimed in claim 1, wherein a grey-level curve of the display varies with viewing angle in the second display mode.

3. A display as claimed in claim 2, wherein for at least one angle in the first viewing angle range but outside the second viewing angle range, the grey level curve is substantially flat.

4. A display as claimed in claim 1, wherein the liquid crystal molecules of the at least one region of the liquid crystal layer produce, in the second state, an angle-dependent change in the polarization state of light passing through the at least one region of the liquid crystal layer.

5. A display as claimed in claim 4, wherein the liquid crystal molecules of the at least one region of the liquid crystal layer produce, in the second state, substantially no change in the polarisation state of light passing through the at least one region of the liquid crystal layer at angles within the first angular viewing range.

6. A display as claimed in claim 5, wherein the liquid crystal molecules of the at least one region of the liquid crystal layer produce, in the second state, a viewing angle-dependent refractive index anisotropy for the at least one region of the liquid crystal layer.

7. A display as claimed in claim 6, wherein the liquid crystal molecules of the at least one region of the liquid crystal layer produce, in the second state, substantially no change in the polarization state of light passing through the at least one region of the liquid crystal layer at angles within the first angular viewing range, and
wherein the liquid crystal molecules of the at least one region of the liquid crystal layer produce, in the second state, substantially zero refractive index anisotropy for light propagating along the normal axis of the display.

8. A display as claimed in claim 5, wherein the liquid crystal molecules of the at least one region of the liquid crystal layer produce, in the second state, a viewing angle-dependent angle between the optic axis of the liquid crystal layer and the transmission axis of one of the polarisers for the at least one region of the liquid crystal layer.

9. A display as claimed in claim 5, wherein the liquid crystal molecules of the at least one region of the liquid crystal layer produce, in the second state, a viewing angle-dependent angle between the optic axis of the liquid crystal layer and the transmission axis of one of the polarizers for the at least one region of the liquid crystal layer, and
wherein, at normal incidence, the optic axis of the at least one region of the liquid crystal layer is substantially parallel to the transmission axis of the one of the polarizers.

10. A display as claimed in claim 1, wherein, in the second state, the liquid crystal layer has at least a first region in which the liquid crystal molecules have a first liquid crystal alignment and a second region in which the liquid crystal molecules have a second liquid crystal alignment different from the first liquid crystal alignment.

11. A display as claimed in claim 10, wherein the first region and the second region are laterally adjacent.

12. A display as claimed in claim 11, wherein in the second state, the first region and the second region each extend through the thickness of the liquid crystal layer.

13. A display as claimed in claim 10, further comprising a patterned alignment surface arranged to define the first region and the second region in the liquid crystal layer.

14. A display as claimed in claim 10, further comprising a patterned electrode layer arranged to define the first region and the second region in the liquid crystal layer.

15. A display as claimed in claim 10 wherein, in the second state, the first region extends through a first portion of the thickness of the liquid crystal layer and the second region extends through a second portion of the thickness of the liquid crystal layer.

16. A display as claimed in claim 15, wherein the liquid crystal layer is an OCB liquid crystal layer.

17. A display as claimed in claim 10, wherein, in the second state, the liquid crystal layer further includes at least a third region in which the liquid crystal molecules have a third liquid crystal alignment and a fourth region in which the liquid crystal molecules have a fourth liquid crystal alignment, the third and fourth liquid crystal alignments being different from one another and being different from the first and second liquid crystal alignments.

18. A display as claimed in claim 17, wherein the liquid crystal layer is a VAN liquid crystal layer.

19. A display as claimed in claim 1, wherein the liquid crystal layer is an ECB liquid crystal layer.

20. A display as claimed in claim 1, further comprising another liquid crystal layer disposed between the liquid crystal layer and the one of the first polarizer and said one of the second polarizer and the reflector; wherein, in the second mode, the liquid crystal molecules of the liquid crystal layer have a first liquid crystal alignment and the liquid crystal molecules of the another liquid crystal layer have a second liquid crystal alignment different from the first liquid crystal alignment.

21. A display as claimed in claim 10, wherein the first and second liquid crystal alignment are tilt alignments.

22. A display as claimed in claim 21, wherein the first tilt alignment is in an opposite direction, relative to the normal axis of the display, to the second tilt alignment.

23. A display as claimed in claim 21, wherein the first tilt alignment is in the same direction, relative to the normal axis of the display, as the second tilt alignment and the first tilt alignment has a different angle of tilt than the second tilt alignment.

24. A display as claimed in claim 1, wherein the liquid crystal layer has a refractive index anisotropy of one sign and wherein the display further comprises an optical compensation layer having a refractive index anisotropy of an opposite sign.

25. A display as claimed in claim 24, wherein the liquid crystal layer has a positive refractive index anisotropy and the optical compensation layer has a negative refractive index anisotropy.

26. A display as claimed in claim 1, wherein, in the first state, liquid crystal molecules of the at least one region of the liquid crystal layer are aligned substantially perpendicular to the normal axis of the display.

27. A display as claimed in claim 1, wherein the second viewing angle range is within the first viewing angle range.

28. A display as claimed in claim 1, wherein the second viewing angle range includes the normal direction.

29. A display as claimed in claim 1, wherein the second viewing angle range has a bisector which is non-normal to the display.

30. A display as claimed in claim 1, wherein the display is arranged to display an indication when the molecules are in the second state.

31. A display as claimed in claim 30, wherein the display is arranged to display the indication in response to the content of data for display.

32. A display as claimed in claim 1, further comprising an ambient light sensor arranged to cause the display to provide the second viewing angle range when the ambient light is below a threshold.

33. A display as claimed in claim 1, wherein the image display layer is a liquid crystal display layer.

34. A display as claimed in claim 1, wherein the display is a vehicle display.

* * * * *